United States Patent
Pechanek et al.

[11] Patent Number: 6,128,720
[45] Date of Patent: *Oct. 3, 2000

[54] DISTRIBUTED PROCESSING ARRAY WITH COMPONENT PROCESSORS PERFORMING CUSTOMIZED INTERPRETATION OF INSTRUCTIONS

[75] Inventors: Gerald G. Pechanek, Cary; Larry D. Larsen, Raleigh; Clair John Glossner, Durham, all of N.C.; Stamatis Vassiliadis, Zoetermeer, Netherlands

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/838,803

[22] Filed: Apr. 10, 1997

Related U.S. Application Data

[63] Continuation of application No. 08/365,858, Dec. 29, 1994, abandoned.

[51] Int. Cl.[7] ............................................. G06F 15/16
[52] U.S. Cl. ............................. 712/20; 712/15; 712/21; 712/22; 712/209; 712/226
[58] Field of Search .................................. 395/279, 421, 395/567, 800.22, 800.2, 800.11, 800.15, 800.21, 570; 364/748, 800; 712/20, 21, 22, 15, 209, 226

[56] References Cited

U.S. PATENT DOCUMENTS

| | | |
|---|---|---|
| 4,783,738 | 11/1988 | Li et al. ............................... 395/800 |
| 4,873,626 | 10/1989 | Gifford .................................. 395/300 |
| 4,916,652 | 4/1990 | Schwarz ................................ 364/748 |
| 4,991,080 | 2/1991 | Emma et al. .......................... 364/200 |
| 4,992,933 | 2/1991 | Taylor ................................... 395/800 |
| 5,101,341 | 3/1992 | Circello et al. ....................... 395/375 |
| 5,142,631 | 8/1992 | Murray et al. ........................ 395/375 |
| 5,142,633 | 8/1992 | Murray et al. ........................ 395/375 |
| 5,163,139 | 11/1992 | Haigh et al. .......................... 395/375 |
| 5,185,870 | 2/1993 | Lenoski ................................. 395/375 |
| 5,212,778 | 5/1993 | Dally et al. ...................... 395/421.08 |
| 5,214,763 | 5/1993 | Blaner et al. ......................... 395/375 |
| 5,220,656 | 6/1993 | Itomitsu et al. ...................... 395/375 |
| 5,269,008 | 12/1993 | Kobayashi et al. .................. 395/375 |
| 5,295,249 | 3/1994 | Blaner et al. ......................... 395/375 |
| 5,303,356 | 4/1994 | Vassiliadis et al. .................. 395/375 |
| 5,475,856 | 12/1995 | Kogge ................................... 395/800 |
| 5,517,665 | 5/1996 | Sprague et al. ...................... 395/800 |
| 5,542,026 | 7/1996 | Pachanek et al. ...................... 706/41 |
| 5,682,491 | 10/1997 | Pechanek et al. .................... 712/209 |
| 5,682,544 | 10/1997 | Pechanek et al. ............... 395/800.16 |

*Primary Examiner*—Richard L. Ellis
*Assistant Examiner*—Gautam R. Patel
*Attorney, Agent, or Firm*—John D. Flynn; Morgan & Finnegan

[57] ABSTRACT

A multi-processor array organization is dynamically configured by the inclusion of a configuration topology field in instructions broadcast to the processors in the array. Each of the processors in the array is capable of performing a customized data selection and storage, instruction execution, and result destination selection, by uniquely interpreting a broadcast instruction by using the identity of the processor executing the instruction. In this manner, processing elements in a large multi-processing array can be dynamically reconfigured and have their operations customized for each processor using broadcast instructions.

23 Claims, 18 Drawing Sheets

(A)

| PHASE 1: | PHASE 2: | PHASE 3: | PHASE 4: |
|---|---|---|---|
| FETCH & DISTRIBUTE | DECODE | EXECUTE & COMMUNICATE | CONDITION CODE RETURN |
| INSTRUCTION FETCH FROM I-MEM | DECODE INSTR, DECODE TAG, DATA ADDR GEN, & UNCONDITIONAL AND SHORT CONDITIONAL BR ADDR. GEN. | DATA TRANSFER LOADS & STORES | PE CONDITIONS & SEQUENCER EXCEPTIONS AVAILABLE FOR BRANCH LOGIC & SPECIAL PURPOSE REG. STORAGE |
| SEND INSTR. TO SEQUENCERS & PEs | | PE PARALLEL EXECUTE & COMMUNICATE TO DIRECT ATTACHED PE | |

(B)

| PHASE 1: | PHASE 2: | PHASE 3: | PHASE 4: | PHASE 5: |
|---|---|---|---|---|
| FETCH | DISTRIBUTE | DECODE | EXECUTE & COMMUNICATE | CONDITION CODE RETURN |
| INSTRUCTION FETCH FROM I-MEM | SEND INSTR. TO SEQUENCERS & PEs | DECODE INSTR, DECODE TAG, DATA ADDR GEN, & UNCONDITIONAL AND SHORT CONDITIONAL BR ADDR. GEN. | DATA TRANSFER LOADS & STORES | PE CONDITIONS & SEQUENCER EXCEPTIONS AVAILABLE FOR BRANCH LOGIC & SPECIAL PURPOSE REG. STORAGE |
| | | | PE PARALLEL EXECUTE & COMMUNICATE TO DIRECT ATTACHED PE | |

FIG. 4

INSTRUCTION FORMAT

| OPCODE | bx | OPX | Rb | Ri/Ru | IMMEDIATE | TRGT |
|--------|----|-----|----|----|----------|------|
| PEIL | b0 | 5 | 1 | 2 | 1 | 0 |

EXAMPLE ASSEMBLER

EXAMPLE DEFINITION

PEIL5 b0,1,2,1,0 = OPCODE (OPX) bx,RB,Ri/Ru,Imm,TRGT =

FIG. 8

| COLUMN → | 0 | 1 | 2 | FOLD | 5 | 6 | 7 | |
|---|---|---|---|---|---|---|---|---|
| 0 | p0,0 | p1,0 | p2,0 | p3,0 | p4,0 | p5,0 | p6,0 | p7,0 |
| 1 | p0,1 | p1,1 | p2,1 | p3,1 | p4,1 | p5,1 | p6,1 | p7,1 |
| 2 | p0,2 | p1,2 | p2,2 | p3,2 | p4,2 | p5,2 | p6,2 | p7,2 |
| FOLD — 3 | p0,3 | p1,3 | p2,3 | p3,3 | p4,3 | p5,3 | p6,3 | p7,3 — FOLD |
| 4 | p0,4 | p1,4 | p2,4 | p3,4 | p4,4 | p5,4 | p6,4 | p7,4 |
| 5 | p0,5 | p1,5 | p2,5 | p3,5 | p4,5 | p5,5 | p6,5 | p7,5 |
| 6 | p0,6 | p1,6 | p2,6 | p3,6 | p4,6 | p5,6 | p6,6 | p7,6 |
| 7 | p0,7 | p1,7 | p2,7 | p3,7 | p4,7 | p5,7 | p6,7 | p7,7 |

ROWS                      FOLD

\* MAKE ABOVE TWO FOLDS THEN FOLD THE
  RESULTANT SQUARE ON THE DIAGONAL.

FIG. 10

| FIG. 10A |
|---|
| FIG. 10B-1 |
| FIG. 10B-2 |

FIG. 10A

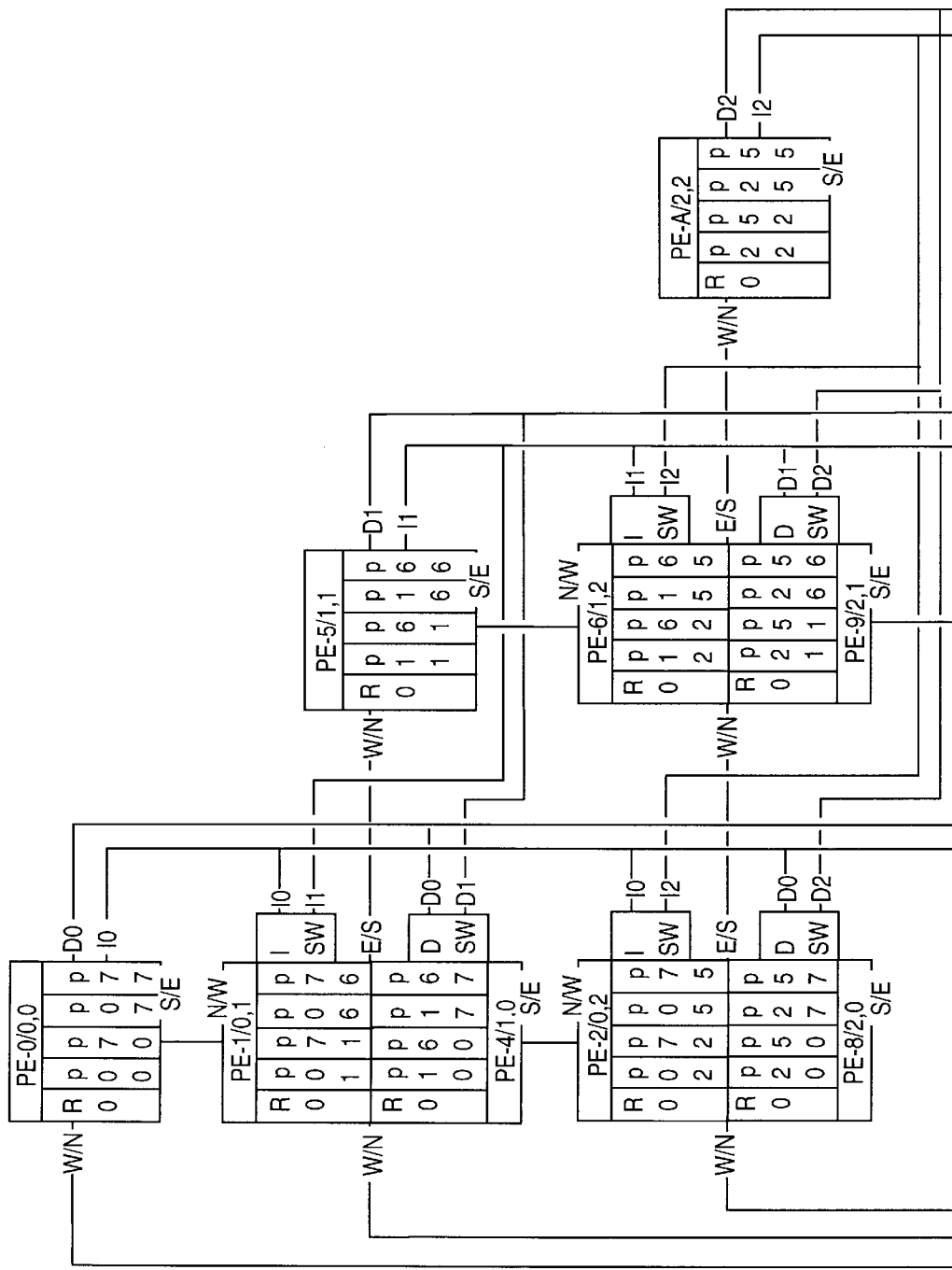

| bits | | | | | |
|---|---|---|---|---|---|
| 33\|22222222\|222211\|11111110 00\|00\|00000 | | | | | |
| 10\|98765432\|109876\|54321098 7\|65\|43210 | | | | | |

| 11 OPCODE | SP-SRC | ??????? SRF | OX3 | PE-TRGT | LOAD PE REGISTER |

| 11 OPCODE | 16-b IMMEDIATE ADDRESS | OX3 | PE-TRGT | DIRECT ADDRESSED LOAD |

| 11 OPCODE | SP-Rb | 9-b DISPLACEMENT | SRF | OX3 | PE-TRGT | DISPLACEMENT ADDRESSED LOAD |

| 11 OPCODE | SP-Rb | SP-Ri h1/h0 b3/b2/h0 | 4-b IMD | SR F | OX3 | PE-TRGT | INDEXED ADDRESSING |

| SP-Ri (h0) | | | SP-RI REGISTER UTILIZATION |
| SP-Ri (h1) | | |
| SP-Ri (b3) | SP-Ri (b2) | |

FIG. 11

| 3 3 | 2 2 2 2 2 2 2 | 2 2 2 2 1 1 | 1 1 1 1 1 1 1 1 0 0 | 0 0 | 0 0 0 0 0 |
| 1 0 | 9 8 7 6 5 4 3 | 2 1 0 9 8 | 7 6 5 4 3 2 1 0 9 8 | 7 6 | 5 4 3 2 1 0 |

| 1 1 | OPCODE | SP-TRGT | ? ? ? ? ? ? ? ? ? | SRF | OX3 0 0 | PE-SRC ? ? ? ? ? |

STORE PE REGISTER
STORE PE COND/STATUS

| 1 1 | OPCODE | 16-b IMMEDIATE ADDRESS | OX3 0 0 | PE-SRC ? ? ? ? ? |

DIRECT ADDRESSED STORE
STORE PE COND/STATUS

| 1 1 | OPCODE | SP-Rb | 9-b DISPLACEMENT | SRF | OX3 0 0 | PE-SRC ? ? ? ? ? |

DISPLACEMENT ADDRESSED STORED
STORE PE COND/STATUS

| 1 1 | OPCODE | SP-Rb | SP-Ri h1/h0 b3/b2/h0 | 4-b IMD | SRF | OX3 0 0 | PE-SRC ? ? ? ? ? |

INDEXED ADDRESSING
STORE PE COND/STATUS

| SP-Ri (h1) | SP-Ri (h0) |
| SP-Ri (b3) | SP-Ri (b2) | |

SP-Ri REGISTER UTILIZATION

FIG. 12

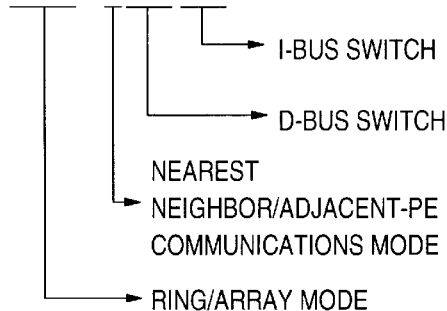

```
|3 3|2 2 2 2 2 2 2|2 2 2 1 1 1 1 1 1 1 1 1 1 0 0 0 0 0 0 0 0 0 0|
|1 9|9 8 7 6 5 4 3|2 1 0 9 8 7 6 5 4 3 2 1 0 9 8 7 6 5 4 3 2 1 0|
|0 1| OPCODE |? ? ? ? ? ? ? ? ? ? ? ? ?|R/A|?|NN|DS|IS|
```

- I-BUS SWITCH
- D-BUS SWITCH
- NEAREST NEIGHBOR/ADJACENT-PE COMMUNICATIONS MODE
- RING/ARRAY MODE

SET MODE OPERATION
- I-BUS SWITCH
    - 00 = IA-BUS PORT CONNECTS TO THE TOP PE AND IB-BUS PORT CONNECTS TO THE BOTTOM PE
    - 01 = IA-BUS PORT CONNECTS TO THE TOP PE AND BOTTOM PE AND IB-BUS PORT NOT CONNECTED
    - 10 = IB-BUS PORT CONNECTS TO THE TOP PE AND BOTTOM PE AND IA-BUS PORT NOT CONNECTED
    - 11 = IA-BUS PORT CONNECTS TO THE BOTTOM PE AND IB-BUS PORT CONNECTS TO THE TOP PE
- D-BUS SWITCH
    - 00 = DA-BUS PORT CONNECTS TO THE TOP PE AND DB-BUS PORT CONNECTS TO THE BOTTOM PE
    - 01 = DA-BUS PORT CONNECTS TO THE TOP PE AND BOTTOM PE AND DB-BUS PORT NOT CONNECTED
    - 10 = DB-BUS PORT CONNECTS TO THE TOP PE AND BOTTOM PE AND DA-BUS PORT NOT CONNECTED
    - 11 = DA-BUS PORT CONNECTS TO THE BOTTOM PE AND DB-BUS PORT CONNECTS TO THE TOP PE
- NEAREST NEIGHBOR/ADJACENT-PE COMMUNICATIONS MODE
    - 0 = NEAREST NEIGHBOR COMMUNICATIONS ENABLED
    - 1 = ADJACENT-PE COMMUNICATIONS ENABLED
- RING/ARRAY MODE
    - 000 = ROW RINGS: N AND S PORTS DISABLED. E AND W PORTS ENABLED
    - 001 = COLUMN RINGS: E AND W PORTS DISABLED. N AND S PORTS ENABLED
    - 010 = ASYMMETRIC PE GROUPS
    - 011 = ARRAY MODE
    - 100-111 = RESERVED

FIG. 13

DISTRIBUTED PROCESSING ARRAY WITH COMPONENT PROCESSORS PERFORMING CUSTOMIZED INTERPRETATION OF INSTRUCTIONS

RELATED PATENT APPLICATIONS

This is a Continuation of application Ser. No. 08/365,858, filed on Dec. 29, 1994, abandoned.

The invention disclosed herein is related to the invention described in the U.S. patent application Ser. No. 07/864,112, now abandoned filed Apr. 6, 1992, entitled "Massively Parallel Array Processor, by G. G. Pechanek, et al., assigned to the IBM Corporation and incorporated herein by reference.

The invention disclosed herein is also related to the U.S. patent application by G. G. Pechanek, et al. which is entitled "ARRAY PROCESSOR TOPOLOGY RECONFIGURATION SYSTEM AND METHOD", Ser. No. 08/366,140, filed Dec. 29, 1994, now U.S. Pat. No. 5,682,491, assigned to the International Business Machines Corporation, and incorporated herein by reference.

FIELD OF THE INVENTION

The invention disclosed broadly relates to data processing systems and methods, and more particularly relates to improvements in the parallel processing architectures.

BACKGROUND OF THE INVENTION

Three standard techniques used in parallel processing architectures: these include pipelining, use of multiple simple processing elements, and multi-processing. Pipelines are used to achieve time parallelism, where the independent steps in multi-cycle operations are executed in parallel, thereby improving performance. An array of Processing Elements (PEs), termed an array processor, achieves a physical parallelism through operating the multiple elements synchronously in parallel. A multi-processing system achieves an asynchronous parallelism with multiple communicating processes executing on independent systems. This invention is concerned with the pipeline control of multiple processing elements connected together in some topology.

OBJECTS OF THE INVENTION

It is therefore an object of the invention to provide a low latency pipeline for a data processing system with multiple processing elements and controllers.

It is another object of the invention to provide a single source synchronization control for single instruction multiple data array of processing elements.

It is still a further object of the invention to provide programmable reconfigurability of a scalable array in a parallel processing system.

SUMMARY OF THE INVENTION

These and other objects, features and advantages are accomplished by the distributed control pipeline with joint processor element/sequencer control invention which is disclosed herein. The invention provides for instructions which have a meaning which is derived from the identity of the processor element executing the instruction. An array of processing elements is supplied with a sequence of instructions from an instruction storage. The instructions can be distributed in broadcast mode to a plurality of processing elements. Included in each instruction is a tag field which is combined with an identity value for each respective processing element receiving one of the broadcast instructions. The combination of the tag field and the processor identity results in a value which is used to interpret the opcode portion of the instruction in that particular processor. The interpreted meaning of the instruction can be different for each of the processors receiving the broadcast instruction.

This customized interpretation of the opcode in a broadcast instruction enables the processor elements (PE) executing the instruction to selectively store portions of data which is broadcast on a data bus to all the PEs. The customized interpretation of the instruction in a PE permits a customized selection of arithmetic execution in response to the customized interpretation of the opcode for that instruction.

Still further, the customized interpretation of a broadcast instruction by a particular PE can be used by that processor in directing the results of the arithmetic computations to other PEs in the array. Each PE executing an instruction in its customized mode, will drive steering information to steer the results of the computation from that PE to another selected PE in the array.

The ability to provide customized data selection, execution operations, and result destinations for each of the PEs in a multi-processor array, enables an efficient use of instructions for providing a large diversity in resulting computer processor operations.

This concept is expanded to include the customized distribution of instructions from a sequencer processor (also referred to as control unit) which has the duty of accessing instructions from the instruction store and distributing those instructions to the array of PEs. Each instruction includes a configuration topology field. The configuration topology field is interpreted by a first sequencing processor which accesses the instruction, to selectively broadcast the instruction to other sequencing processors in the array, for single instruction multiple data (SIMD) mode of operation. Alternately, a configuration topology field in an instruction can control the sequencing processor accessing data instruction, to only distribute that instruction to processor elements directly connected to that sequencing processor. In this mode, multiple sequencing processors can be programmed to access instructions having topology configuration fields restricting them to broadcasting instructions only to respective groups of processing elements directly connected to a sequencing processor. In this mode of operation, a multiple data stream (MIMD) mode of operation can be selectively organized.

In this manner, great flexibility is obtained by the use of tag fields and configuration topology fields in instructions of a large array of processing elements and sequencing processors.

DESCRIPTION OF THE FIGURES

These and other objects, features and advantages will be more fully appreciated with reference to the accompanying figures.

FIG. 3A illustrates the general form of the implementation dependent instruction for a 4×4 and an 8×8 tag.

FIG. 4 illustrates the execution pipeline, in accordance with the invention.

FIG. 8 illustrates a processor element indexed load instruction assembler code definition.

FIG. 10 illustrates an 8×8 array A loaded onto a 4×4 folded array B.

FIGS. 10A, 10B-1 & 10B-2 illustrates an SP/PE tagged load word instructions.

FIG. 11 illustrates an SP/PE tagged store word instructions.

FIG. 12 illustrates sequencer tagged store word instructions.

FIG. 13 illustrates control of the configuration bits.

DISCUSSION OF THE PREFERRED EMBODIMENT

Figure 1:
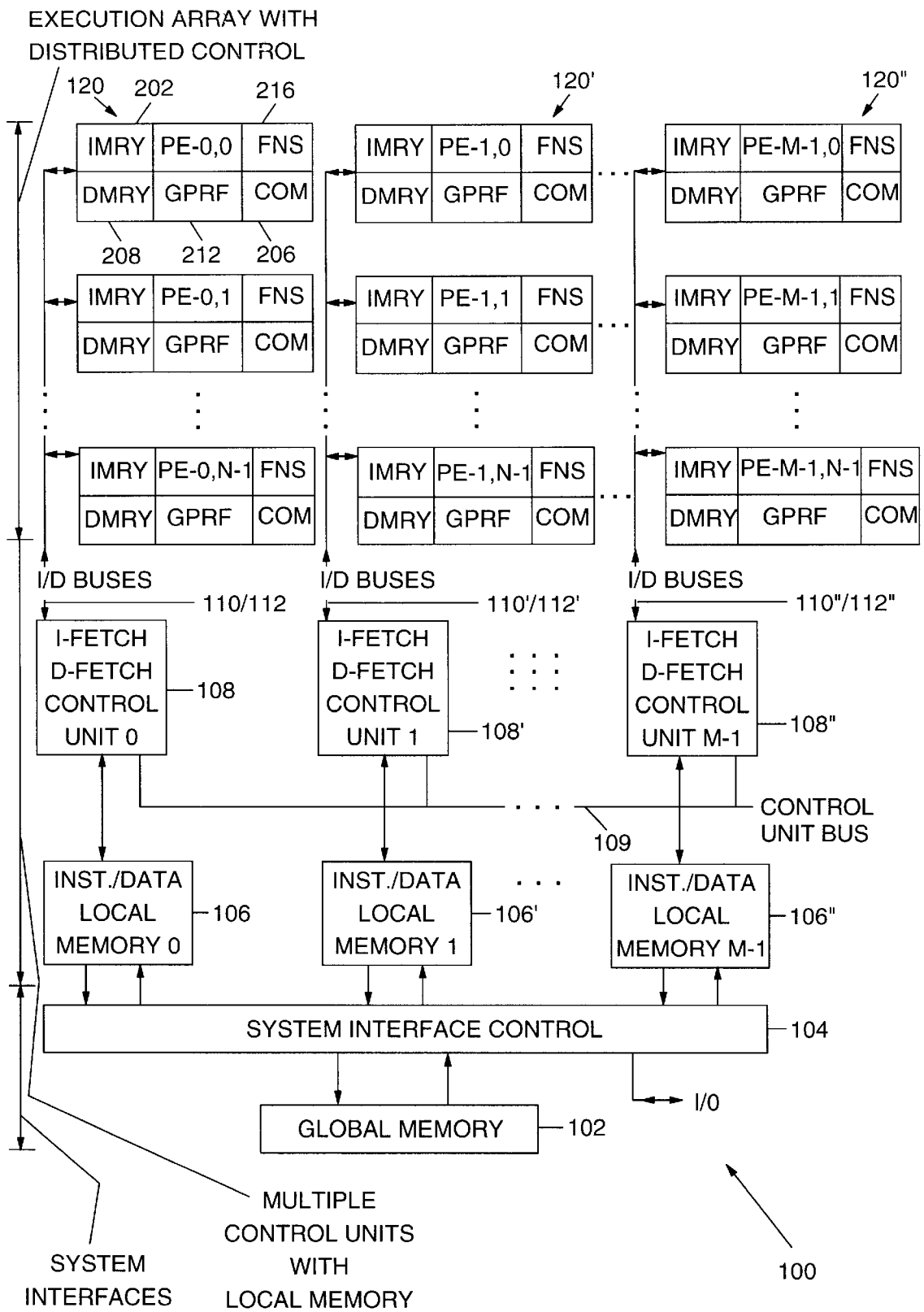
FIG. 1 is a high level architectural diagram of an array machine organization with multiple control units, in accordance with the invention.

FIG. 1 is a high level architectural diagram of an array machine organization 100, having multiple control units. FIG. 1 shows the array 100 which includes a global memory 102 and a system interface controller 104. These collectively are the system interfaces, the system interface control being connected to an input/output bus.

Figure 3:
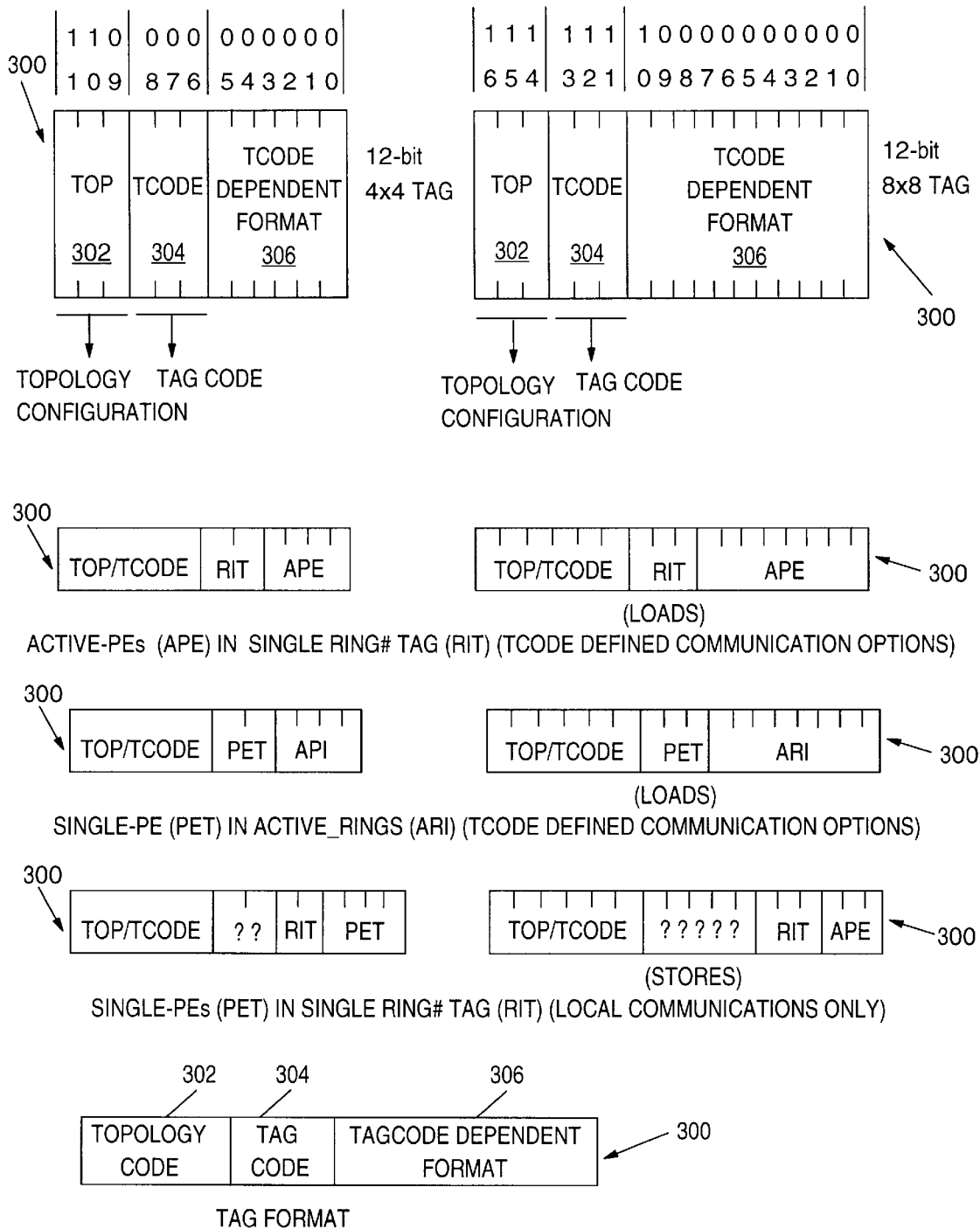
FIG. 3 illustrates a tag format, in accordance with the invention.

Also shown in FIG. 1 is a first instruction/data local memory 106 which is connected to the system interface control 104, for storing instructions. Tags 300, as shown in FIG. 3, are concatenated to the instructions in control units 108. The memory 106 also stores data, the instructions and the data having been accessed from the global memory 102 through the system interface control 104.

First I-Fetch/D-Fetch sequencer processor control unit 108 is connected to the instruction/data local memory 106, for fetching instructions and data from the memory 106.

Reference to FIG. 3 will show the general format for tags 300 which include a topology configuration field 302, a tag portion 304, and the opcode portion 306. In accordance with the invention, instruction opcode in conjunction with the tag 300 will have a meaning interpreted based upon the identity of the processing element 120 or the sequencing element 108 which executes the instruction.

Returning to FIG. 1, a plurality of first processor elements 120 are connected to the first control unit 108 by means of a first data bus 112 and a first instruction bus 110. Each of the processor elements 120 has a unique identity value which is designated in FIG. 1 as PEi,j, where i and j are the respective column values and row values for the array of processor elements shown in FIG. 1. For example, the processor element shown at the upper left hand corner of FIG. 1 has a unique identify value of PE0,0. The next lower processor element 120 beneath the first processor element of FIG. 1, has a different unique identity value PE0,1.

Figure 2:
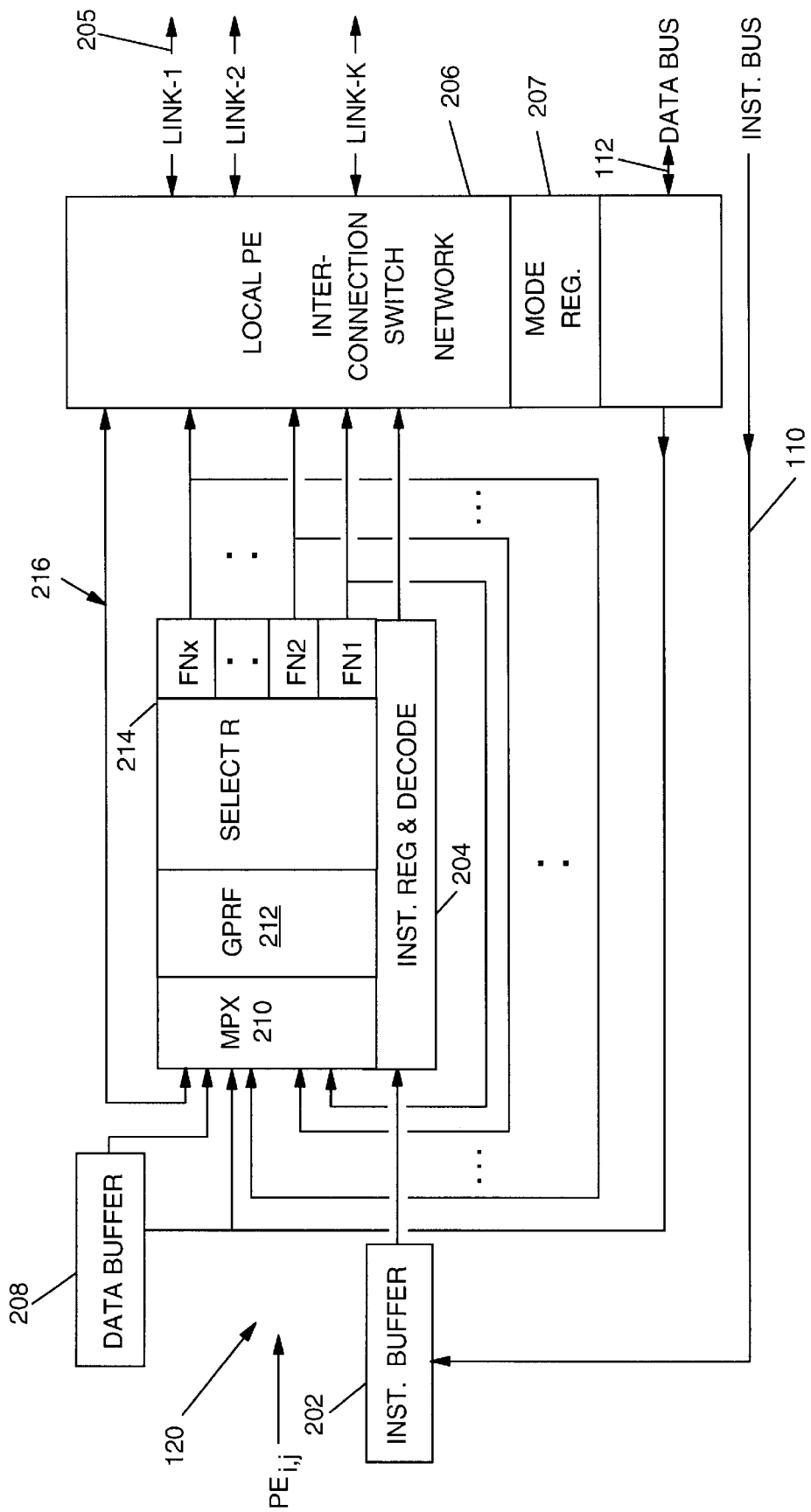
FIG. 2 is an illustration of a generalized processing element.

Turning now to FIG. 2, a more detailed illustration is given of a processor element 120. There it is seen that the processor element 120 includes an instruction buffer 202 which is connected to the instruction bus 110. The instruction buffer 202 is then connected to an instruction register and decode 204. A data buffer 208 is connected to the data bus 112 through the interconnection switch 206. The data buffer 208 is connected to the multiplexer 210. A general purpose register file 212 is connected to the multiplexer 210 and to a selector 214. A plurality of arithmetic units 216 perform various arithmetic functions FN1, FN2, through FNX. The local processor element interconnection switch 206 selectively connects the processor element 120 to various links 205 which connect to other processor 120 in the array 100. A mode register 207 is connected to the instruction register 204 and through the instruction buffer 202 to the instruction bus 110, for storing a topology configuration value from the topology field 302.

Figure 5:
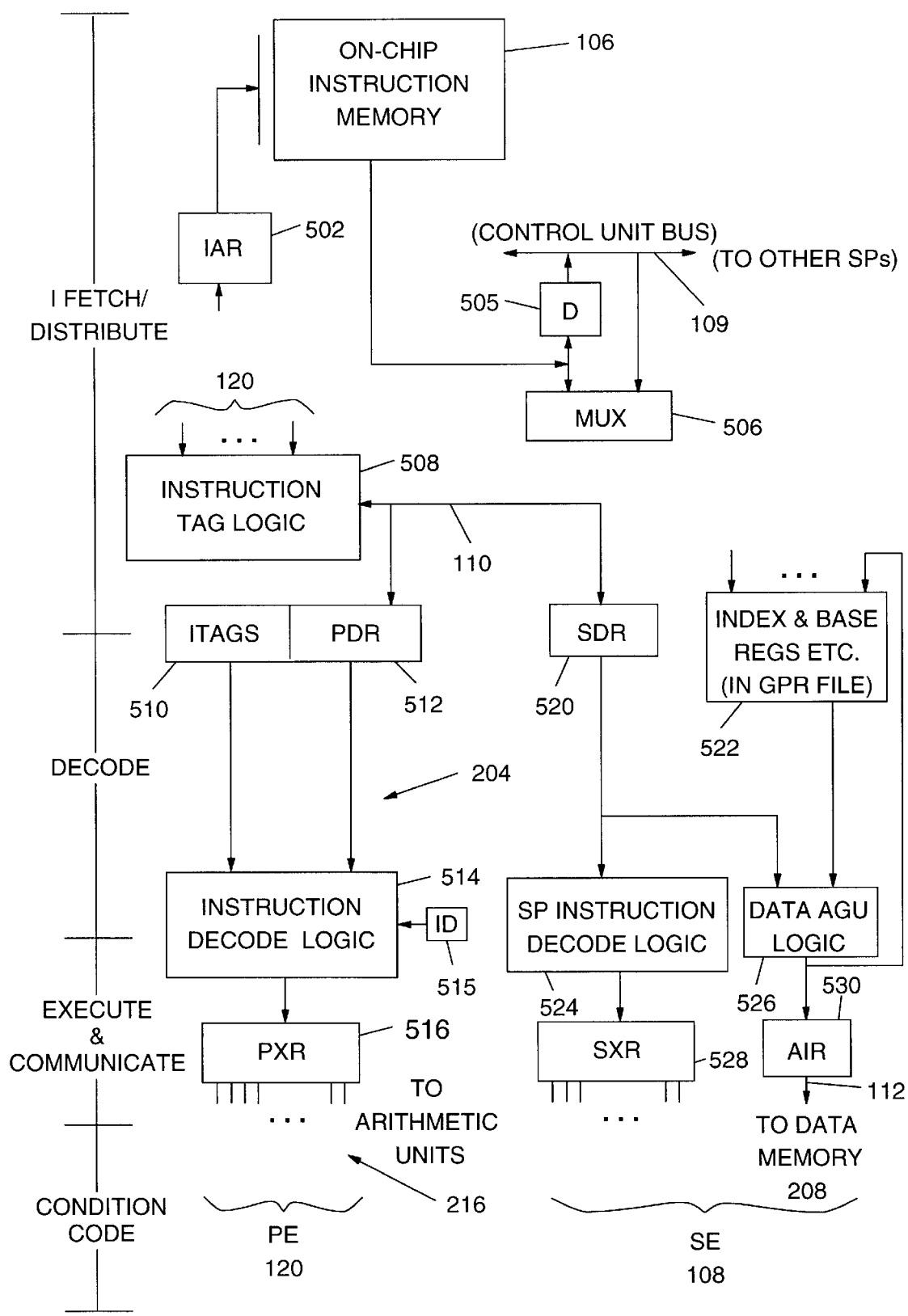
FIG. 5 illustrates a high level diagram of the instruction pipeline.
Figure 6:
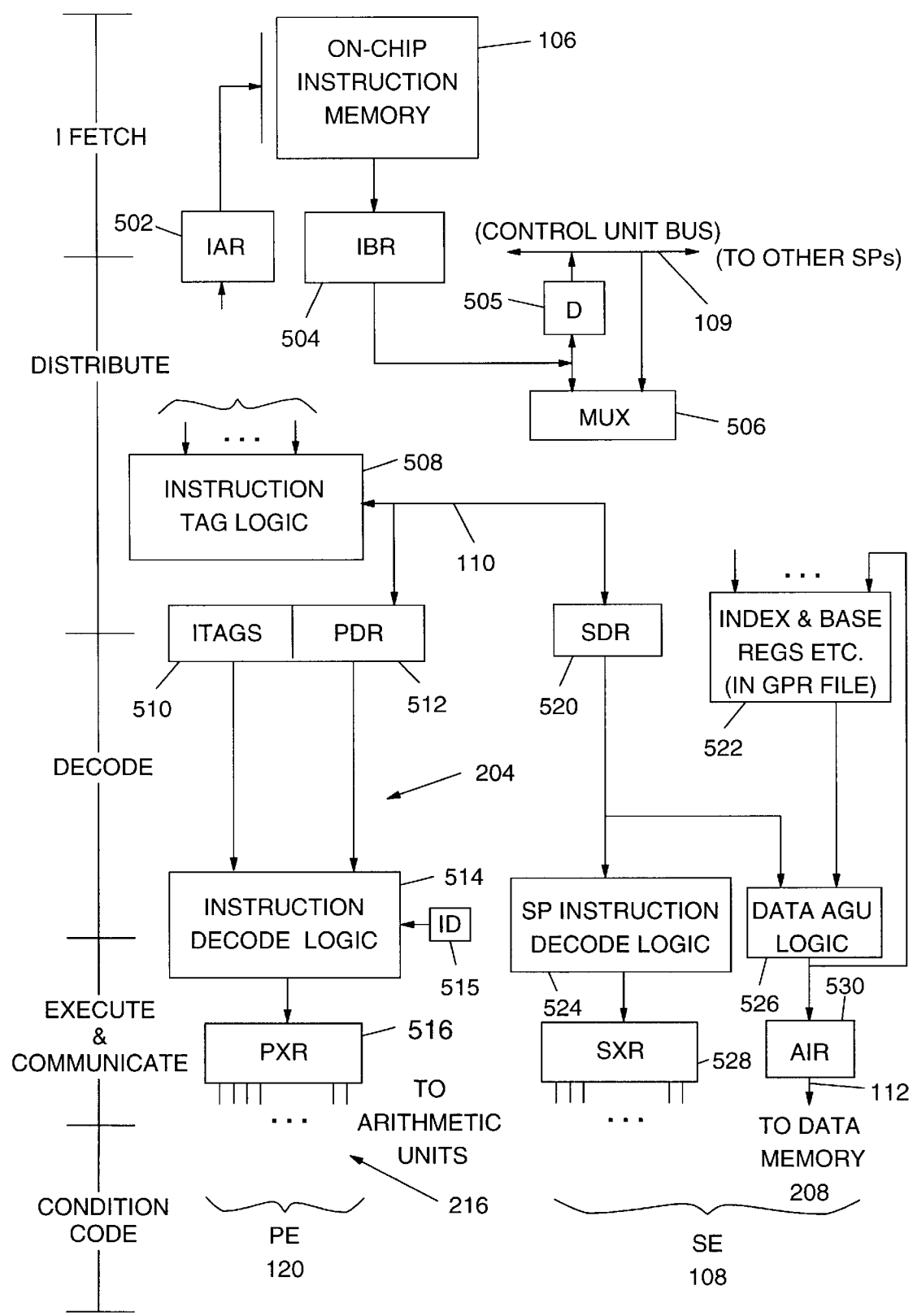
FIG. 6 illustrates the instruction pipeline with distribute phase.

Reference can be made to FIG. 5 which shows the instruction pipeline which includes components from the control unit 108 and the processing element 120. Along the left hand margin of FIG. 5 is a vertical line showing the phase stages for a first embodiment of the invention for arrays of processing elements which are 9×9 or fewer. Corresponding illustration is shown in FIG. 6 for arrays of processor elements which are greater than 10×10. In FIG. 5, it is seen that the phases are divided into a first instruction fetch/distribute phase, followed by a decode phase, followed by an execute and communicate phase which is followed by a condition code return phase. In FIG. 6, it is seen that the phases are divided into a first instruction fetch phase, followed by a distinct distribute phase, which is followed by a decode phase, which is followed by an execute and communicate phase, which is followed by a condition code phase. The distinct distribute phase shown in FIG. 6 is provided for larger arrays of 10×10 processing elements or more, in order to enable additional time to distribute instructions among the various sequencers and processing elements.

Now returning to FIG. 5, the on chip memory 106 is shown with an input from an instruction address register 502. The output of the on chip memory 106 is applied to the multiplexer 506 and the switch 505, which connects to the control unit bus 109 which is also shown in FIG. 1. Control unit bus 109 enables communication of instructions from a first control unit 108 to other control units 108' and 108", selectively. The multiplexer 506 and switch 505 are included within the control unit 108.

Also included in the control unit 108 is the sequencer decode register 520, the sequencer processor instruction decode logic 524 and the sequence execution register 528. A sequential address program counter outputs the next instruction address to the on chip instruction memory 106 through the instruction address register 502. The sequencer decode register 520 also applies an output to the data address generation unit logic 526. Another input is applied from the index and base registers 522 of the sequencer's general purpose register file, for example, to the data address generation unit logic 526, whose output is applied to the address register 530 which provides addresses on the data bus 112 to the data memory 208 of all of the process elements 120. The data is broadcast over the data bus 112 to all of the processor elements 120 connected to the control unit 108.

FIG. 5 also shows the instruction bus 110 from the multiplexer 506 to the instruction tag logic 508, which outputs the tag code to the register 510 and then to the instruction decode logic 514. The processor decode register 512 is also connected between the instruction bus 110 and instruction decode logic 512. Connected to the instruction decode logic 512 is the identity value register 515 which stores the identity PEi,j of the processor element 120 within which the instruction is currently being executed. In accordance with the invention, the instruction decode logic combines the identity value PEi,j in register 515 with the tag code from the instruction tag logic 508, to provide a mode for interpreting the opcode applied from the processor decode register 512. The operation of combining the processor element identity value and the tag code can be selected from a variety of numerical operations, such as simple concatenation of the two values, arithmetic addition or multiplication of the two values, applying a hashing function to the two values, or other arithmetic operations which will yield a result value which can be used to select an appropriate interpretation of the opcode portion of the instruction. The instruction decode logic 514 outputs the interpreted meaning of the instruction to the processor element execution register 516, for application to the arithmetic units 216 in the processor element.

Each processor element 120 includes a general purpose register file 212 which is connected to the first data bus 112 and to the instruction decode 514, for selectively buffering some of the data values which are broadcast over the data bus 112. The selection of which one or ones of the many units of data broadcast over the data bus 112 for buffering in the general purpose register 212 of a particular processor element 120, is done in response to the instruction decode 514 in that processor, determining how the particular instruction is to be executed at that processor.

Each of the processor elements 120 further includes an arithmetic element 216 which is connected to the first data bus 112 and also connected to the instruction decode 514 in the processor, for executing a particular one of the instructions in response to the instruction decode 514 determining how that particular instruction is to be executed in that processor. This mode of execution is determined, in part, by the combination of the processor element ID from register 515 and the tag code value, as interpreted in the instruction decode logic 514, as discussed above.

It can be seen in FIG. 6 that an instruction buffer register 504 is included at the output of the on chip instruction memory 106, to enable the temporary storage of instructions output from the memory 106 for a sufficient duration to allow distribution of instructions by the multiplexer 506 and the switch 505, to large arrays of processor elements, as described above.

Reference to FIG. 1 shows that the array there is arranged with a plurality of sequencer element control units 108, 108' and 108", each of which respectively outputs instructions to corresponding groups of processor elements 120, 120' and 120". In a first organization mode, the instruction control units 108, 108' and 108" share the same instruction accessed from a single local memory 106. In this mode of single instruction multiple data (SIMD) operation, the sequencing processor control unit 108 accesses instructions from the local memory 106 and distributes them to its own processor elements 120 and also to the sequencing processing control unit 108' and 108". The sequencing processor controller 108' distributes the instructions received from the first control unit 108, and distributes them to its processor elements 120'. Correspondingly, the control unit 108" receives the instructions distributed by the first control unit 108, and distributes them to its corresponding processor elements 120". In this manner, a single instruction is broadcast to many processor elements in the array. The actual interpretation of the meaning of the instruction for each of the respective processors in the array depends upon the processor identity value PEi,j, as it is combined with the tagged value 304 for the instruction, as described above. The data distributed to the processors in this SIMD mode of operation, can be either the data accessed from a single local memory 106 or data accessed from each of a plurality of local memories 106, 106' and 106". In the multiple data mode, the control unit 108 accesses data from the local memory 106 and applies it to the processor elements 120, whereas the control unit 108' accesses data from the local memory 106' and applies it to the processor elements 120', and the control unit 108" accesses data from the local memory 106" and applies it to the processor elements 120". This organization of a SIMD array shown in FIG. 1 can be dynamically changed in its configuration to another configuration such as the folded mesh array shown in FIG. 9 or in FIG. 10. The dynamic reconfiguration of the processor elements 120, 120' and 120" and the sequencing elements of 108, 108' and 108", is done in response to a topology configuration value 302 which is contained in the instruction 300. The topology configuration value 302 in an instruction, is recognized by the multiplexer 506 and the switch 505 of FIGS. 5 and 6. The topology configuration value 302 will control the multiplexing pattern for the multiplexer 506 and the switching pattern for the switch 505 so as to interconnect the processor elements of the array 100 in any one of a variety of differing interconnection topologies. Also included in the reconfiguration operation, is the interconnection switch 206 of each processor element 120, shown in FIG. 2. It can be seen that it would be necessary to modify the links 205 between respective processor elements 120 in any reconfiguration of the array 100 shown in FIGS. 1, 9 or 10. Additional information on folded mesh arrayed topologies can be found in the above-cited co-pending patent application by G. G. Pechanek, et al, which is incorporated herein by reference.

Each of the processor elements shown in FIG. 2 includes a mode register 207 which is connected to the instruction/data local memory 106, for receiving a topology configuration value 302 in the tag 300. The processor elements 120 further include an interconnection switch 206 connected to interprocessor links 205 and to the mode register 207, for selectively interconnecting a first processor element 120 to another processor element 120', in response to the topology configuration value 302 in the tag 300. In this manner, the array 100 can be dynamically reconfigured into multiple interconnection topologies in response to the configuration value 302 of the tag 300.

DETAILED DESCRIPTION OF THE INVENTION

FIG. 1 depicts a high level view of the array processor machine organization. The machine organization is partitioned into three main parts: the System Interfaces including Global Memory and external I/O, multiple Control Units with Local Memory, and the Execution Array with Distributed Control PEs. The System Interface is an application-dependent interface through which the array processor interfaces with Global Memory, the I/O, other system processors, and the personal computer/workstation host. Consequently, the System Interface will vary depending upon the application and the overall system design. The Control Units contain the local memory for instruction and data storage, instruction fetch (I-Fetch) mechanisms, and operand or data fetch mechanisms (D-Fetch). The Execution Array with Distributed Control PEs is a computational topology of processing elements chosen for a particular application. For example, the array may consists of N Processing Elements (PEs) per control unit, with each PE containing an Instruction Buffer (IBFR), a General Purpose Register File (GPRF), Functional Execution units (FNS), Communication Facilities (COM), and interfaces to its Instruction/Data buses. The PEs may also contain PE-local instruction and data memories. Further, each PE contains an instruction decode register which supports distributed control of the multiple PEs. Synchronism of local memory accessing is a cooperative process between the control units, local memories, and the PEs. The array of PEs allows computation functions (FNS) to be executed in parallel in the PEs and results to be communicated (COM) between PEs.

With the multiple SIMD machine organization, e.g. FIG. 1, it is possible to create single or multiple thread machines wherein the topology of PEs and communication facilities can be configured for a more optimum topology depending upon the application. For example, some possible machine organizations are; multiple linear rings, a nearest neighbor 2-dimension mesh array, a folded nearest neighbor 2-dimension mesh, multiple-fold mesh, a 2-dimension hexagonal array, a folded 2-dimension hexagonal array, a folded mesh of trees, combinations of the above as well as others.

FIG. 2 depicts a generalized PE. The PE contains a COM facility identified as the local interconnection switch network. This COM facility provides the means for interfacing the GPRF and the arithmetic elements with neighboring PEs via the Links. The COM facility also provides the connecting interface to the control units local memory subsystem. The general philosophy of the instruction pipeline is for the Control Units, also termed Sequence Processors (SPs), to access instructions and pass on to the PEs any instructions designated to go there. This can be accomplished by use of the tagging of instructions. In a multiple PE organization there is a need to load single and multiple PEs, store register/status registers from single PEs to memory, and control the PEs in different topologies. Rather than proliferate opcodes to accomplish these tasks, tags are created and concatenated to the instructions for PE decode and control. Tags operate as a mode control extension field to the instruction formats. By use of the VLIW concept, the operating modes can be changed on a cycle by cycle basis if required. Since the tag is generated from information stored in a special purpose register, its definition can be machine dependent allowing smaller tags for small machine organizations and larger tags for larger organizations. FIG. 3 depicts a generic form for the tag. The instructions executed by the Processing Elements contain 32 bits plus a system dependent tag field. As an example, the Instruction Tag bits can convey specific status and mode information registered in the SP to the PEs, as well as specific PE identifier values to support individual loading of the PEs. All instructions are defined as broadcast operations going to all PEs associated with a specific control unit's instruction bus. Specific tagged compute instructions are controlled by the tag field. If tagged compute is not specified all PEs execute the instruction independent of the tag-code field.

Each PE is identified by a ring number, ring-# and a PE number, PE-#. This internal ID number, ID # can be used in conjunction with a tagged instruction to control the activity of the PEs. Both the instruction tag-code and instruction opcode are decoded during the decode phase of the pipeline and determine whether the execute phase for that instruction should be accomplished in each individual PE. In other words, the Tag code operates as a mode control extension to the instruction opcode field. The allowable communications options are defined by the tag-code field, which precludes hazardous communication options. The programmer must set the operating mode which then is coded by the hardware into the tag. The tag-code is a scalable field that can change with the topology. For example, an 9-bit tag could be created for a 2×2 array, a 12-bit for a 4×4, a 17-bit for an 8×8 array, and other variations are possible. The general form of the implementation dependent instruction 4×4-tag and 8×8-tag are shown below: (FIG. 3A)

In many processors, a three-phase fetch, decode, and execute pipeline is used for the basic instruction execution control where the instruction fetched is received in a single instruction decode unit. This requires that an instruction be fetched from one of N instruction memories and then be distributed to N sequencers and PEs with both the sequencers and PEs decoding and executing in synchronism the received instructions. Depending upon topology size and the intended cycle time, the fetching and distributing of instructions can be accomplished in either a combined fetch/distribute cycle or in separate fetch and distribute cycles. For scalable topologies under consideration of 2×2 up to 10×10 it is envisioned that a combined fetch/distribute cycle is appropriate. In order to handle relatively high usage arithmetic conditional branch and PE generated exception conditional branch operations, a separate exception condition return phase is provided and two branch execution timings architectured. FIG. 4A and FIG. 5 show two views of the four phase pipe; fetch/distribute, decode, execute, and condition code return (See Table 1). Table 1 shows a four phase instruction pipeline diagram example which is depicted in FIG. 5. FIG. 4B and FIG. 6 depict a five phase pipeline for larger topologies with fast cycle times (See Table 2). Table 2 shows a five phase instruction pipeline diagram example which is depicted in FIG. 6.

Unlike more conventional DSPs, the SPs and PEs, both have facilities to register instructions, decode them, and execute them. Thus, FIG. 5 shows decode registers (SDR and PDR), decode logics, and execute registers (SXR and PXR) in the Processing Elements as well as the Sequence Processor. This approach is used for four reasons:

1. It allows the maximum possible time in the paths from (on-chip) instruction memory to the Sequencer, and from Sequencer to PEs.
2. It makes it possible to minimize the number of signal wires in the busses used to distribute instructions from the Sequencer to the PEs. This is true because the instructions are distributed in coded (short) form rather than in decoded (long) form.
3. It does not restrict the number of PEs or their functional units.
4. It allows the number of sequencers to be scaled in a consistent fashion with the scaling of the PE topology.

Names and abbreviations assigned to the instruction pipeline phases are as follows:

| Abbreviation | Phase Name and Notes |
| --- | --- |
| IAG | Instruction Address Generation: A decision is made during the IAG phase as to which instruction will be fetched next. At the end of the IAG phase, the new instruction address is loaded into IAR in the Sequence Processor. |
| IF | Instruction Fetch: This function begins when the Instruction Address Register IAR) is loaded with a new address. The instruction retrieved from instruction memory is delivered to the control unit on the instruction bus and latched into the Instruction Buffer Register (IBR) at the end of the phase. |

-continued

| Abbreviation | Phase Name and Notes |
|---|---|
| DIST | Instruction Distribution: During the DIST phase, the instruction in the IBR is distributed to the Sequence Processor Decode Register (SDR) and Processing Element Decode Register (PDR). If the system is in Array Mode, the instruction in IBR will be distributed to the decode registers in multiple SPs and their associated PE rings. The phase ends when the buffered instruction is loaded into the various decode registers. |
| IF/DIS | Instruction Fetch/Distribute: This function begins when the IAR is loaded with a new address. The instruction retrieved from instruction memory is delivered to the SP on the instruction bus and is distributed to the Sequence Processor Decode Register (SDR) and Processing Element Decode Register (PDR). If the Array Mode is active, only one instruction memory source will drive the whole array while in ring mode four independent instruction sources each individually drive their rings of PEs. The phase ends when the instruction is loaded into the various decode registers. |
| DEC | Instruction Decode: During the decode phase, the tagged instruction previously latched into the SDR and PDR is decoded. If the instruction is to be executed by the Sequence Processor, an effective address may also be resolved in the SP during this phase. If the instruction to be executed has no action for the PE to perform, a forced NOP is generated during this phase. At the end of this phase, the decoded instruction is latched into the SP Execute Register (SXR) and PE Execute Register (PXR). |
| EX/COM | Instruction Execute: During this phase, the decoded instructions in the Execute Registers are executed and the results are communicated to the DEST target registers. Note that an instruction will execute in the SP and its associated PEs at the same time. |
| CCR | Condition Code Return: A condition code is returned from PEs to the sequencer at the end of the CCR phase. |

Figure 7:
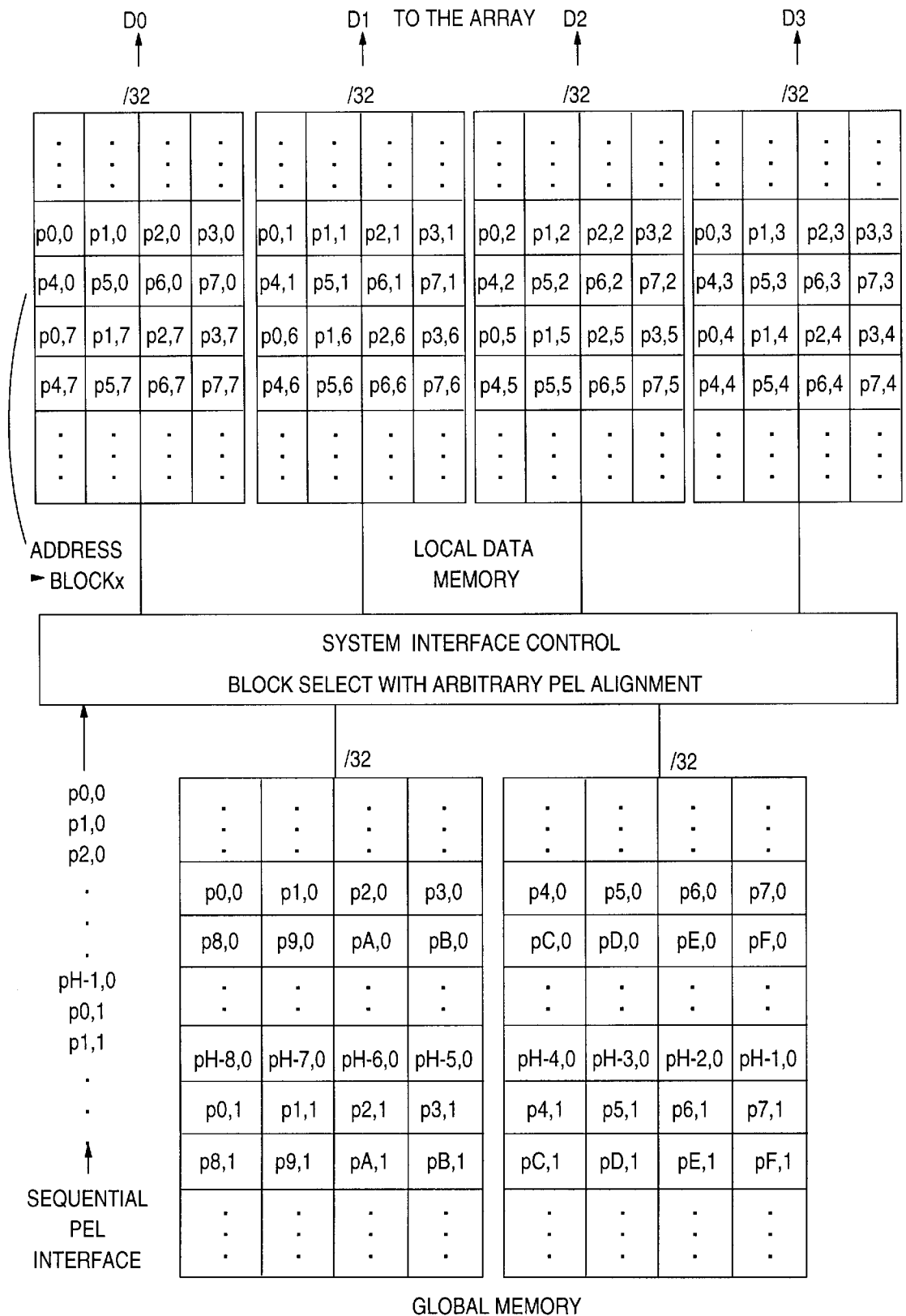
FIG. 7 illustrates an 8×8 array loaded from global memory into the local data memories.
Figure 9A:
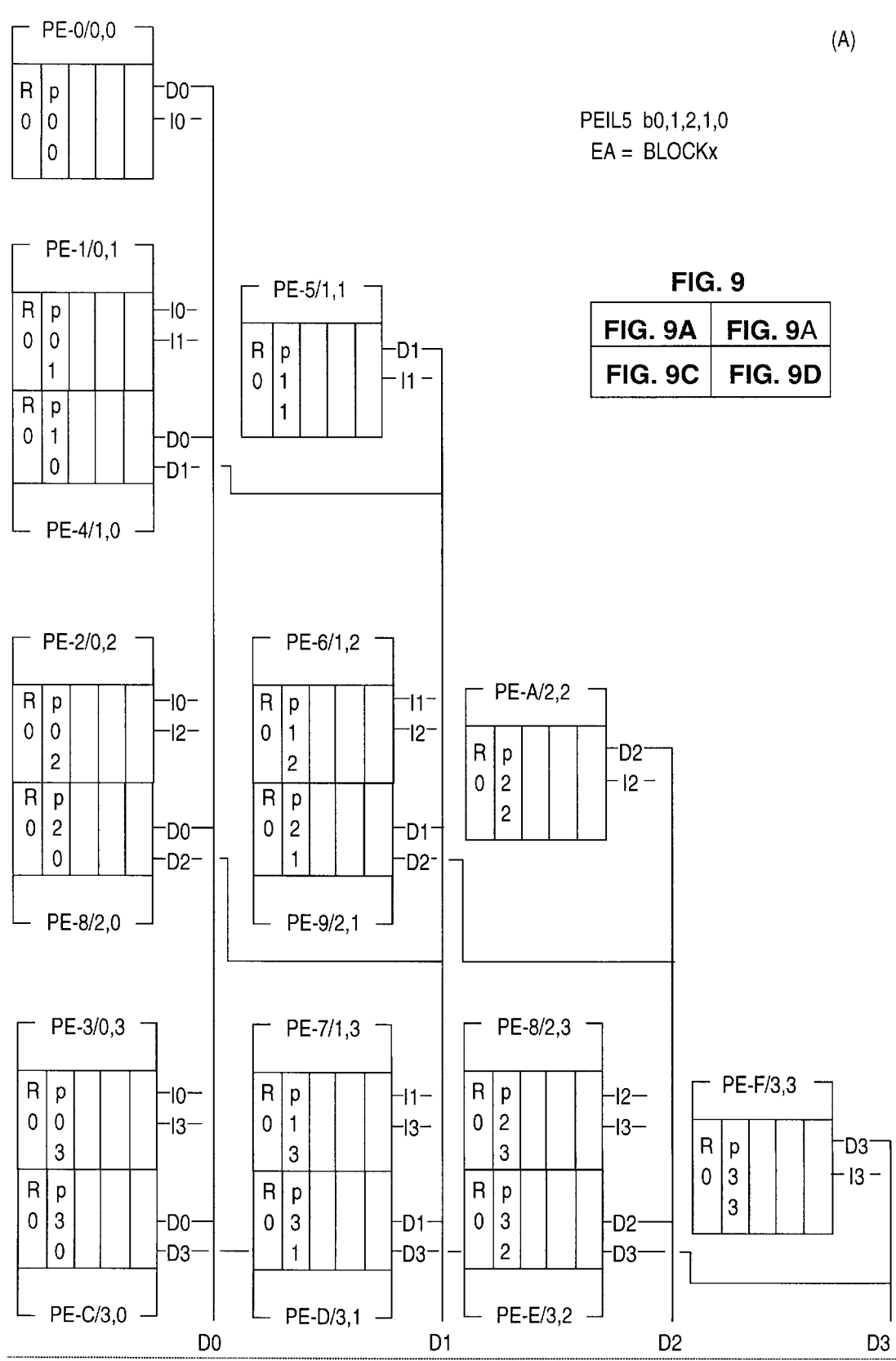
FIG. 9 illustrates a PEIL example.
Figure 9B:
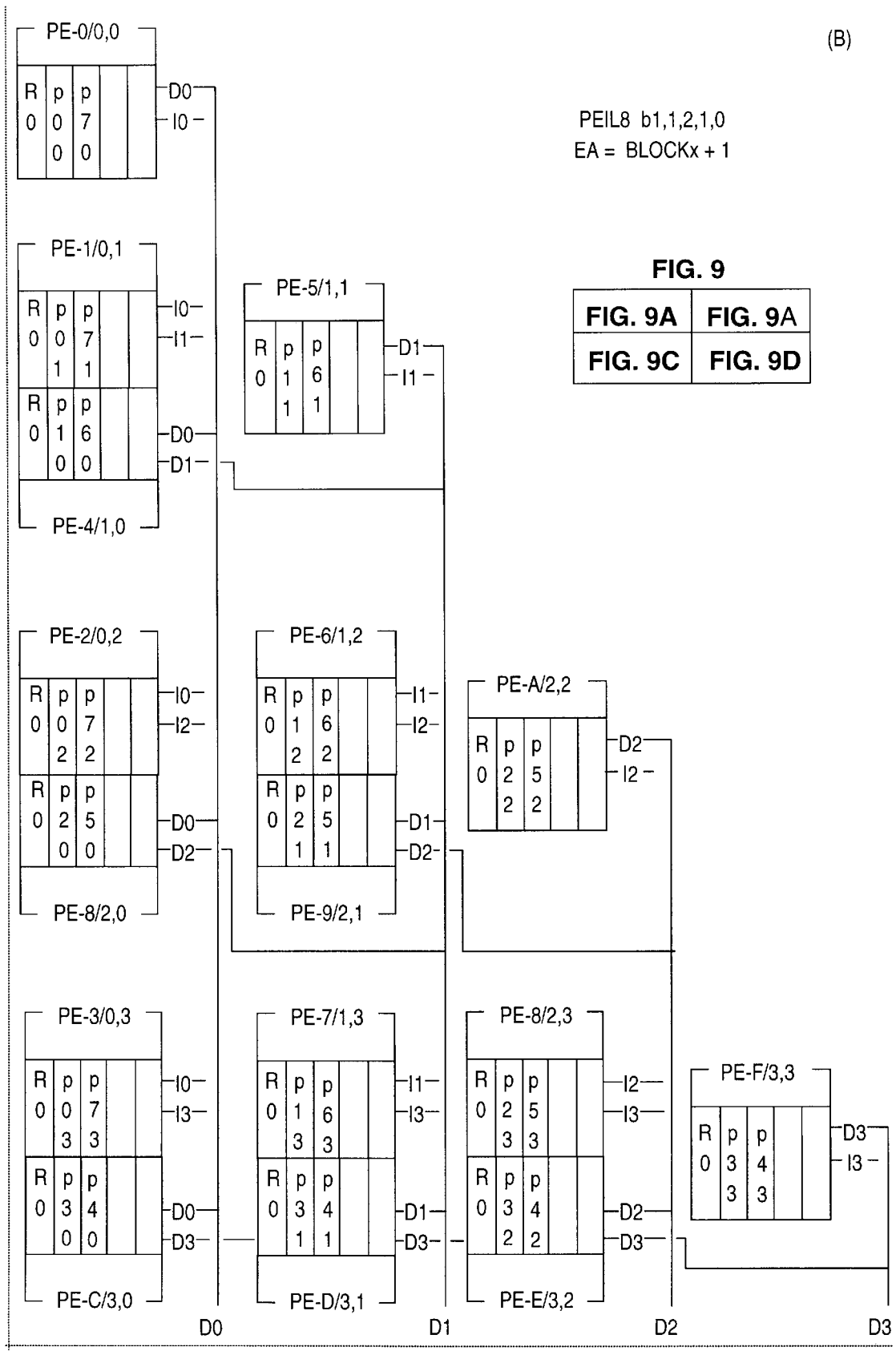
Figure 9C:
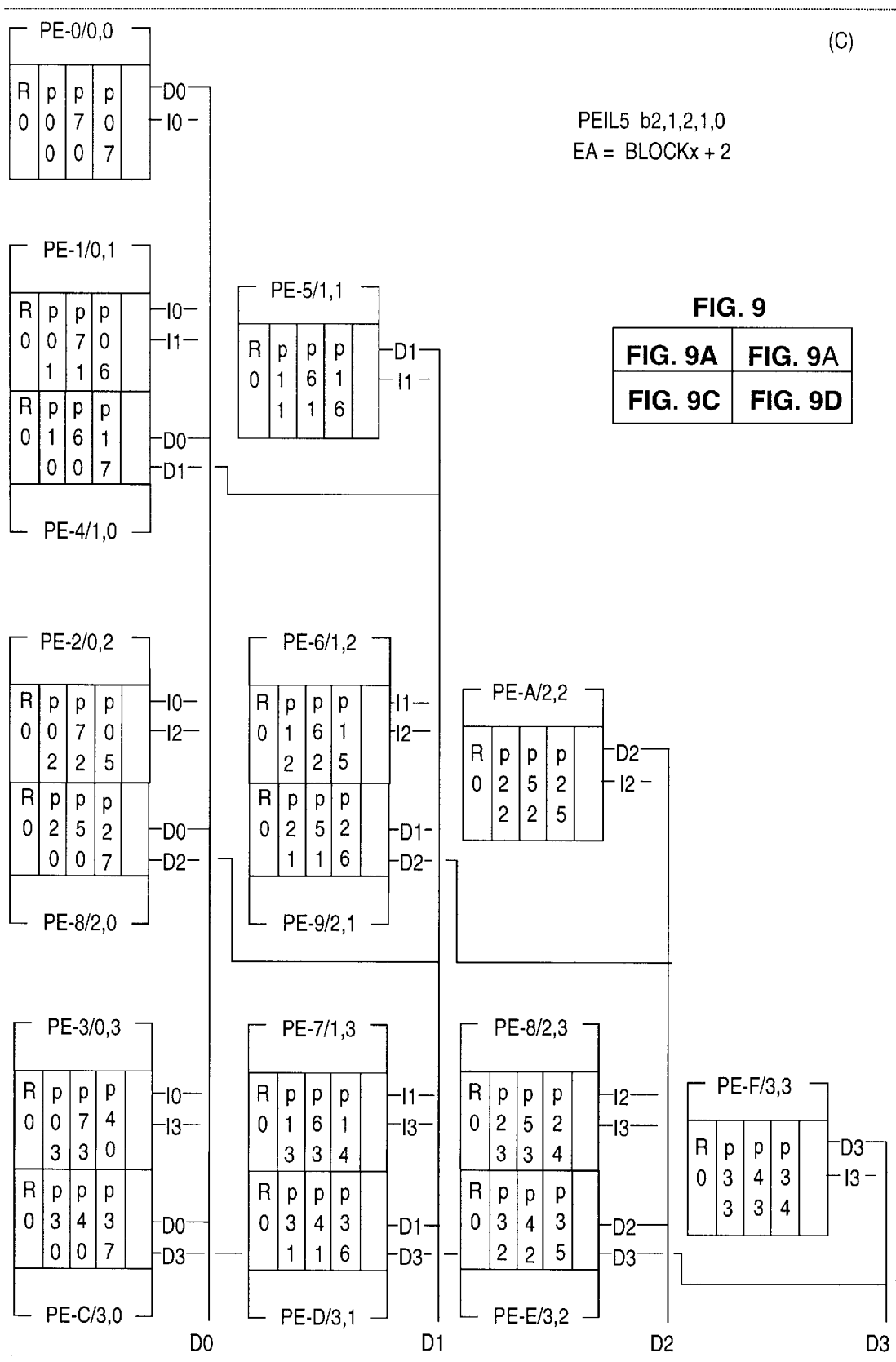
Figure 9D:
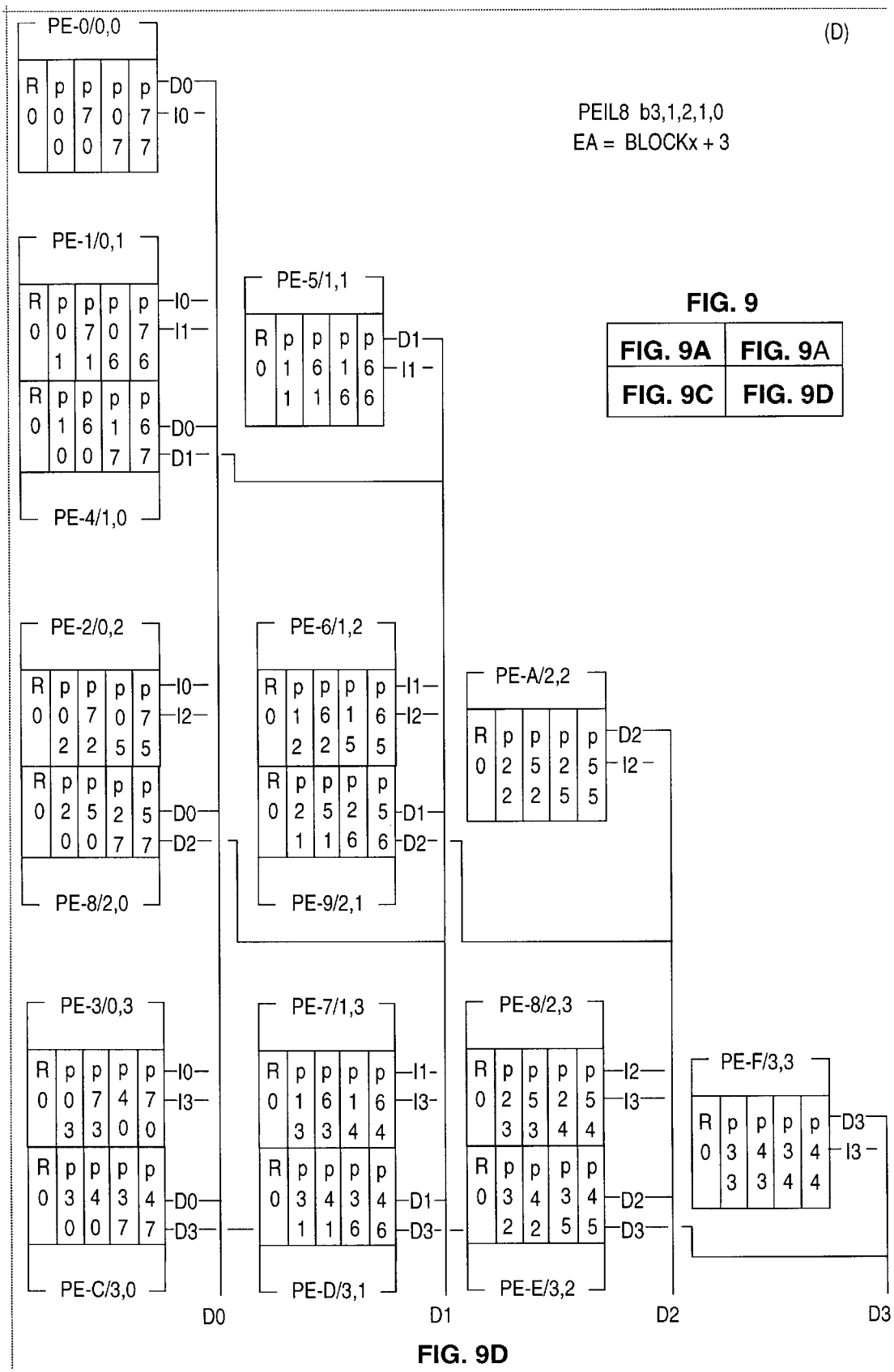

As an example, assume that there is an external video stream of luminance data providing pel data scan line by scan line with H pels per scan line. For example the first scan line is numbered p0,0, p1,0, . . . , pH-1,0. This video data is loaded sequentially into the global memory FIG. 7 From the global memory the data for an 8×8 block is loaded into the local data memory FIG. 7.

Figures 2, 10B:
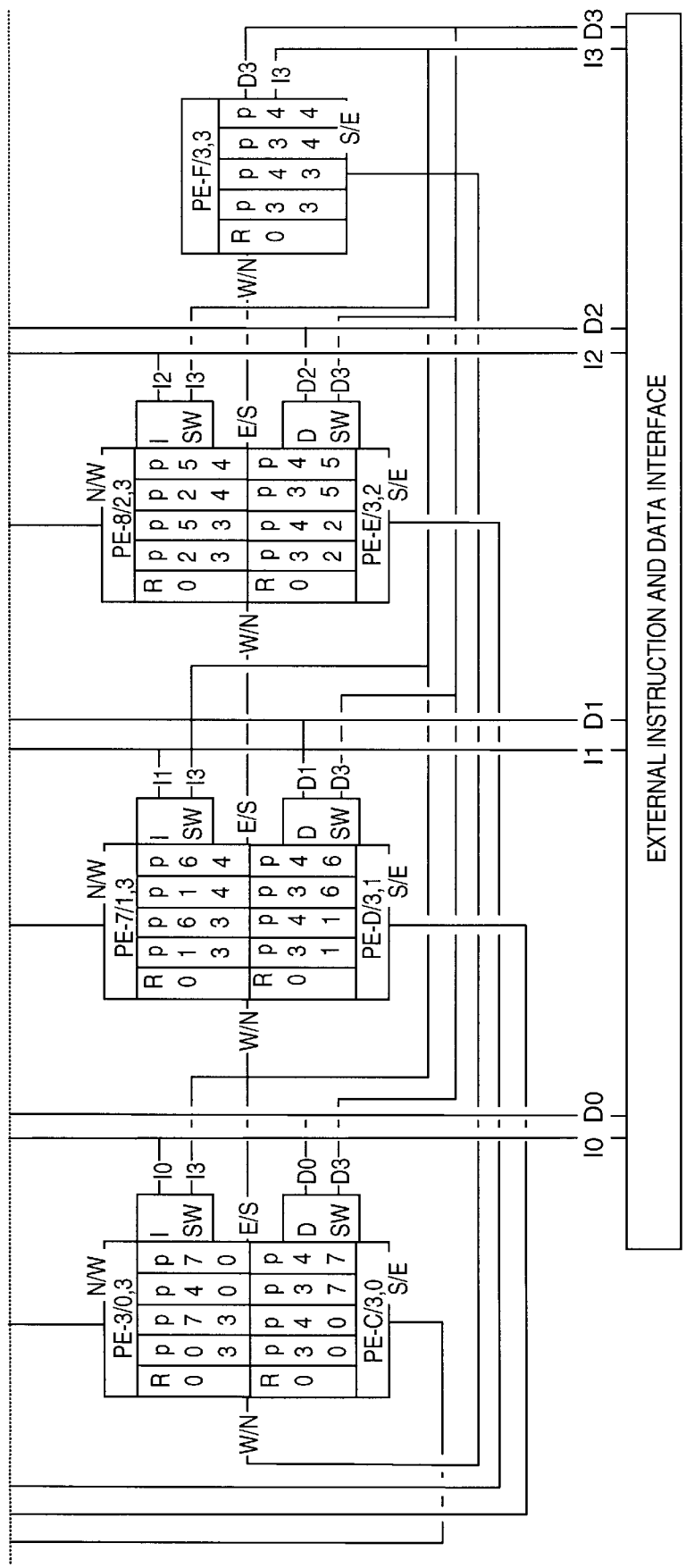

From local data memory the 8×8 block FIG. 10 A is loaded into the array FIG. 10B. The PE Indexed Load instruction (PEIL) is used to accomplish the loading. In the example presented, FIG. 8, the base register Rb=1 is initially set to the address (Block x). The Ri/Ru increment/update register is set to zero, the Immediate field is set to a 1, and the TRGT register in the PEs is set to R0 (0). Two types of PEIL instructions are used, as specified in the OPX extended opcode field, to specify the byte loading pattern into the TRGT PE register.

Array mode is specified, and, for example purposes, the instruction I-Bus and data D-Bus switches are set as follows:
  The I-Bus Switch is set to Column mode:
  I0 connects to PE-0, PE-1, PE-2, and PE-3
  I1 connects to PE-4, PE-5, PE-6, and PE-7
  I2 connects to PE-8, PE-9, PE-10, and PE-11
  I3 connects to PE-12, PE-13, PE-14, and PE-15
  The D-Bus Switch is set to Row mode:
  D0 connects to PE-0, PE-4, PE-8, and PE-12
  D1 connects to PE-1, PE-5, PE-9, and PE-13
  D2 connects to PE-2, PE-6, PE-10, and PE-14
  D3 connects to PE-3, PE-7, PE-11, and PE-15

The following four instructions loads the 8×8 64-pels, 8-bits/pel, into the processor. In array mode the PEIL instruction will cause a 16-byte load to occur, one 4-byte load from each data memory. The results of each PEIL instruction is shown in FIG. 9 parts A, B, C, and D. A larger sized diagram including the 8×8 pel array is depicted in FIG. 10.

1. PEIL5 b0,1,2,1,0 FIG. 9A
2. PEIL8 b1,1,2,1,0 FIG. 9B
3. PEIL5 b2,1,2,1,0 FIG. 9C
4. PEIL8 b3,1,2,1,0 FIG. 9D

Tagged loads require the PEs to check whether the received instruction tag field matches the Ring#/PE# stored in each PEs prior to execution. If a matching tag is not found a NOP is executed.

Tagged stores require the PEs to check whether the received instruction tag field matches the Ring#/PE# stored in each PEs prior to execution. If a matching tag is not found a NOP is executed. (OX3 is a 2-bit opcode extension field. The Condition/Status register in each PE is identified in the following table by C/S.) FIG. 11 shows the sequencer processor/processor element tagged load word instructions for load PE register, direct addressed load, displacement addressed load, indexed addressing, and SP-RI register utilization. Table 3 shows indexed processor element load variants, and Table 4 shows tagged load variants. FIG. 12 shows the sequencer processor/processor element tagged store word instructions for store PE register, direct addressed store, displacement addressed store, indexed addressing, and SP-RI register utilization. Table 5 shows indexed PE load variants, Table 6 shows tagged store variants.

The problems and how they are solved summary:
1. provide a low latency pipeline.
    The use of a combined fetch/distribute sequence provides a low latency pipeline.
2. provide single source synchronization control for a scalable SIMD array of processing elements,
    The Control Unit Bus provides a means for single source synchronization.
3. allow for programmable reconfigurability of the scalable array into multiple smaller independent arrays
    The use of a sequencer per independent array along with the Control Unit Bus provides a programmable means for reconfiguration.

4. provide each of the smaller arrays with their own source synchronization control,
    The independent instruction threads are controlled by each array's sequencer.
5. provide reconfigurable memory resources where all resources are available for the single SIMD array and the resources are equally partitioned to the other smaller arrays,
    By passing single SIMD thread control between the multiple sequencers allows use of all resources in the single SIMD array mode.
6. provide synchronized control for joint operations between the control units and their processing elements,
    With distributed and parallel decode of instructions in the PEs and Sequencers, joint PE/Sequencer control is easily provided.
7. Provide single PE, combination of PEs, single ring, and combination of rings control for loading, storing, and arithmetic control.
    Tagging instructions allows individual PE and combination of PE control for loading, storing, and arithmetic operations.
8. and provide a single control unit design that is replicatable supporting the scalable design requirement.
    The number of control units or sequencers is scalable through use of the Control Unit Bus.

Two mode control registers 207 are provided in each PE 120 to control the basic operational modes in the PEs. The first mode control register contains configuration bits, I-Bus Switch, D-Bus Switch, Nearest-Neighbor/Adjacent-PE Communications Mode, and Ring/Array Mode. The second mode control register contains arithmetic options for Rounding and Saturation control of specific execution unit results. Two PE instructions control the loading of the two registers. The PE Set Mode Instruction shown in FIG. 13 controls the configuration bits and loads all PEs with immediate mode control information contained in the instruction. The PE Set Rounding/Saturation Instruction loads the second register.

For the configuration mode register, the I-Bus switches are controlled from this mode register which specifies in the dual PEs how the two IA/IB bus ports and the two DA/DB bus ports are connected to the top and bottom PE. Using these switch settings and by connecting the I0, I1, I2, I3 and D0, D1, D2, D3 buses as shown in FIG. 10, the I-buses and D-buses can be connected to the row PEs, the column PEs, or asymmetric groupings of PEs. Additional mode bits indicate whether the PEs are in a Nearest Neighbor or Adjacent-PE Communications mode. Mode information must also be provided for how the PE-to-PE interface is to be used when independent row rings or column rings are used, since the nearest neighbor/Adjacent-PE interface is modified accordingly. The following lists the operational mode bit definitions.

I-Bus Switch
00=1A-Bus Port connects to the Top PE, 1B-Bus Port connects to the Bottom PE
01=1A-Bus Port connects to the Top PE and the Bottom PE, 1B-Bus Port not connected
10=1B-Bus Port connects to the Top PE and the Bottom pe, 1A-Bus Port not connected
11=1A-Bus Port connects to the Bottom PE, 1B-Bus Port connects to the Top PE D-Bus Switch
00=DA-Bus Port connects to the Top PE, DB-Bus Port connects to the Bottom PE
01=DA-Bus Port connects to the Top PE and the Bottom PE, DB-Bus Port not connected
10=DB-Bus Port connects to the Top Pe and the Bottom PE, DA-Bus Port not connected
11=DA-Bus Port connects to the Bottom PE, DB-Bus Port connects to the Top PE Nearest Neighbor/Adjacent-PE Communications Mode
0=Nearest Neighbor Communications Enabled
1=Adjacent PE Communications Enabled Ring/Array Mode
000=Row Rings: N and S Ports disabled, E and W Ports enabled
001=Column Rings: E and W Ports disabled, N and S Ports enabled
010=Asymmetric PE groups
011=Array Mode
100–111=Reserved A Load Offset Register instruction provides byte loading of the PE's offset register.

For Conditional Move operations and future extensions, a 32-bit test register is provided in each PE which can be used to Load any register value from the register file and store any value back. No operations are defined to use this register. It is used by conditional move logic. If no conditional moves are used it represents an additional storage space for program use.

Although a specific embodiment of the invention has been disclosed, it will be understood by those having skill in the art that changes can be made to the specific embodiment without departing from the spirit and the scope of the invention.

TABLE 1

4-Phase Instruction Pipeline Diagram Example

| IAR Value | IF/DIST | DEC | EX/COM | CCR |
|---|---|---|---|---|
| i | I(i) | | | |
| i + 2 | I(i + 2) | I(i + 1) | I(i) | |
| i + 3 | I(i + 3) | I(i + 2) | I(i + 1) | I(i) |
| i + 4 | I(i + 4) | I(i + 3) | I(i + 2) | I(i + 1) |

A diagram of this flow is shown in FIG. 5

TABLE 2

5-Phase Instruction Pipeline Diagram Example

| IAR Value | IF | DIST | DEC | EX/COM | CCR |
|---|---|---|---|---|---|
| i | I(i) | | | | |
| i + 2 | I(i + 2) | I(i + 1) | I(i) | | |
| i + 3 | I(i + 3) | I(i + 2) | I(i + 1) | I(i) | |
| i + 4 | I(i + 4) | I(i + 3) | I(i + 2) | I(i + 1) | I(i) |
| i + 5 | I(i + 5) | I(i + 4) | I(i + 3) | I(i + 2) | I(i + 1) |

TABLE 3

Indexed PE Load Variants

| Type | Effective Address Used | Description |
|---|---|---|
| 1 | EA = Rb + Ri(h0);<br>Ri(h0) ← Ri(h0) + S..S,Imm<br>Or,<br>EA = Rb + Ri(h0) (when Imm = 0) | Increment Immediate<br>4-b Immediate sign extended to 16 bits |
| 2 | EA = Rb + Ri(h0);<br>Ri(h0) ← (Ri(h0) + Ri(h1)) Mod Imm<br>Ri(h0) ← Ri(h0) + Ri(h1) (when Imm = 0) | Circular Immediate Indexing |
| 3 | EA = Rb + Ri(h0);<br>Ri(h0) ← (Ri(h0) + Ri(b2)) Mod Ri(b3)<br>Ri(h0) ← Ri(h0) + Ri(b2) (when Ri(b3) = 0) | Circular Register Indexing |

TABLE 5

Indexed PE Load Variants

| Type | Effective Address Used | Description |
|---|---|---|
| 1 | EA = Rb + Ri(h0);<br>Ri(h0) ← Ri(h0) + S..S,Imm<br>Or,<br>EA = Rb + Ri(h0) (when Imm = 0) | Increment Immediate<br>4-b Immediate sign extended to 16 bits |
| 2 | EA = Rb + Ri(h0);<br>Ri(h0) ← (Ri(h0) + Ri(h1)) Mod Imm<br>Ri(h0) ← Ri(h0) + Ri(h1) (when Imm = 0) | Circular Immediate Indexing |
| 3 | EA = Rb + Ri(h0);<br>Ri(h0) ← (Ri(h0) + Ri(b2)) Mod Ri(b3)<br>Ri(h0) ← Ri(h0) + Ri(b2) (when Ri(b3) = 0) | Circular Register Indexing |

TABLE 4

Tagged Load Variants

| Opcode | ox3 | Effective Address Used | Execute Function Performed |
|---|---|---|---|
| xxxxxx0 | ?? | SP-SRC | If tags Match; Then<br>R(TRGT@RIT/APE) ← SP-SRC<br>Else NOP<br>Load 1 or Multiple PEs(APE) in RING # (RIT) |
| xxxxxx0 | ?? | SP-SRC | If tags Match; Then<br>R(TRGT@PET/ARI) ← SP-SRC<br>Else NOP<br>Load a PE(PET) in 1 or Multiple RINGs(ARI) |
| xxxxxx1 | ?? | EA = Imm | If tags Match; Then<br>R(TRGT@RIT/APE) ← SP-MEM(EA)<br>Else NOP<br>Load 1 or Multiple PEs(APE) in RING # (RIT) |
| xxxxxx1 | ?? | EA = Imm | If tags Match in each ring; Then for each ring<br>R(TRGT@PET/ARI) ← Ring(ARI)/SP-MEM(ARI)(EA)<br>Else NOP in each Ring<br>Load a PE(PET) in 1 or Multiple Rings(ARI) |
| xxxxxx2 | ?? | EA = Rb + S..S,Dsp | If tags Match; Then<br>R(TRGT@RIT/APE) ← SP-MEM(EA)<br>Else NOP<br>Load 1 or Multiple PEs(APE) in RING # (RIT) |
| xxxxxx2 | ?? | EA = Rb + S..S,Dsp | If tags Match in each ring; Then for each ring<br>R(TRGT@PET/ARI) ← Ring(ARI)/SP-MEM(ARI)(EA)<br>Else NOP in each Ring<br>Load a PE(PET) in 1 or Multiple Rings(ARI) |
| xxxxxx3 | ?? | EA = Type-1 | If tags Match; Then<br>R(TRGT@RIT/APE) ← SP-MEM(EA)<br>Else NOP<br>Load 1 or Multiple PEs(APE) in RING # (RIT) |
| xxxxxx3 | ?? | EA = Type-1 | If tags Match in each ring; Then for each ring<br>R(TRGT@PET/ARI) ← Ring(ARI)/SP-MEM(ARI)(EA)<br>Else NOP in each Ring<br>Load a PE(PET) in 1 or Multiple Rings(ARI) |
| xxxxxx4 | ?? | EA = Type-2 | If tags Match; Then<br>R(TRGT@RIT/APE) ← SP-MEM(EA)<br>Else NOP<br>Load 1 or Muitiple PEs(APE) in RING # (RIT) |

TABLE 4-continued

Tagged Load Variants

| Opcode | ox3 | Effective Address Used | Execute Function Performed |
|---|---|---|---|
| xxxxxx4 | ?? | EA = Type-2 | If tags Match in each ring; Then for each ring<br>R(TRGT@PET/ARI) ← Ring(AR1)/SP-MEM(ARI)(EA)<br>Else NOP in each Ring<br>Load a PE(PET) in 1 or Muitiple Rings(ARI) |
| xxxxxx5 | ?? | EA = Type-3 | If tags Match; Then<br>R(TRGT@RIT/APE) ← SP-MEM(EA)<br>Else NOP<br>Load 1 or Multiple PEs(APE) in RING # (RIT) |
| xxxxxx5 | ?? | EA = Type-3 | If tags Match in each ring; Then for each ring<br>R(TRGT@PET/ARI) ← Ring(ARI)/SP-MEM(ARI)(EA)<br>Else NOP in each Ring<br>Load a PE(PET) in 1 or Multiple Rings(ARI) |

TABLE 6

Tagged Store Variants

| Opcode | ox3 | Effective Address Used | Execute Function Performed |
|---|---|---|---|
| xxxxxx0 | 00 | PE-SRC | If tags Match; Then<br>SP-TRGT ← R(PE-SRC@RIT/PET)<br>Else NOP<br>Store PE #(PET) RING #(RIT) in SP |
| xxxxxx0 | 01 | SP-SRC | If tags Match; Then<br>SP-TRGT ← R(PE-C/S@RIT/PET)<br>Else NOP<br>Store PE #(PET) RING #(RIT) C/S in SP |
| xxxxxx1 | 00 | EA = Imm | If tags Match; Then<br>SP-MEM(EA) ← R(PE-SRC@RIT/PET)<br>Else NOP<br>Store PE #(PET) RING #(RIT) in MEM |
| xxxxxx1 | 01 | EA = Imm | If tags Match; Then<br>SP-MEM(EA) ← R(PE-C/S@RIT/PET)<br>Else NOP<br>Store PE #(PET) RING #(RIT) C/S in MEM |
| xxxxxx1 | 10 | EA = Imm | Ring-0/SP-MEM-0(EA) ← R(TRGT@Ring-0/PET)<br>Ring-1/SP-MEM-1(EA) ← R(TRGT@Ring-1/PET)<br>Ring-2/SP-MEM-2(EA) ← R(TRGT@Ring-2/PET)<br>Ring-3/SP-MEM-3(EA) ← R(TRGT@Ring-3/PET) |
| xxxxxx2 | 00 | EA = Rb + S..S,Dsp | If tags Match; Then<br>SP-MEM(EA) ← R(PE-SRC@RIT/PET)<br>Else NOP<br>Store PE #(PET) RING #(RIT) in MEM |
| xxxxxx2 | 01 | EA = Rb + S..S,Dsp | If tags Match; Then<br>SP-MEM(EA) ← R(PE-C/S@RIT/PET)<br>Else NOP<br>Store PE #(PET) RING #(RIT) C/S in MEM |
| xxxxxx2 | 10 | EA = Rb + S..S,Dsp | Ring-0/SP-MEM-0(EA) ← R(TRGT@Ring-0/PET)<br>Ring-1/SP-MEM-1(EA) ← R(TRGT@Ring-1/PET)<br>Ring-2/SP-MEM-2(EA) ← R(TRGT@Ring-2/PET)<br>Ring-3/SP-MEM-3(EA) ← R(TRGT@Ring-3/PET) |
| xxxxxx3 | 00 | EA = Type-1 | If tags Match; Then<br>SP-MEM(EA) ← R(PE-SRC@RIT/PET)<br>Else NOP<br>Store PE #(PET) RING #(RIT) in MEM |
| xxxxxx3 | 01 | EA = Type-1 | If tags Match; Then<br>SP-MEM(EA) ← R(PE-C/S@RIT/PET)<br>Else NOP<br>Store PE #(PET) RING #(RIT) C/S in MEM |
| xxxxxx3 | 10 | EA = Type-1 | Ring-0/SP-MEM-0(EA) ← R(TRGT@Ring-0/PET)<br>Ring-1/SP-MEM-1(EA) ← R(TRGT@Ring-1/PET)<br>Ring-2/SP-MEM-2(EA) ← R(TRGT@Ring-2/PET)<br>Ring-3/SP-MEM-3(EA) ← R(TRGT@Ring-3/PET) |
| xxxxxx4 | 00 | EA = Type-2 | If tags Match; Then<br>SP-MEM(EA) ← R(PE-SRC@RIT/PET)<br>Else NOP<br>Store PE #(PET) RING #(RIT) in MEM |
| xxxxxx4 | 01 | EA = Type-2 | If tags Match; Then<br>SP-MEM(EA) ← R(PE-C/S@RIT/PET)<br>Else NOP<br>Store PE #(PET) RING #(R(T) C/S in MEM |

TABLE 6-continued

Tagged Store Variants

| Opcode | ox3 | Effective Address Used | Execute Function Performed |
|---|---|---|---|
| xxxxxx4 | 10 | EA = Type-2 | Ring-0/SP-MEM-0(EA) ← R(TRGT@Ring-0/PET)<br>Ring-1/SP-MEM-1(EA) ← R(TRGT@Ring-1/PET)<br>Ring-2/SP-MEM-2(EA) ← R(TRGT@Ring-2/PET)<br>Ring-3/SP-MEM-3(EA) ← R(TRGT@Ring-3/PET) |
| xxxxxx5 | 00 | EA = Type-3 | If tags Match; Then<br>SP-MEM(EA) ← R(PE-SRC@RIT/PET)<br>Else NOP<br>Store PE #(PET) RING #(RIT) in MEM |
| xxxxxx5 | 01 | EA = Type-3 | If tags Match; Then<br>SP-MEM(EA) ← R(PE-C/S@RIT/PET)<br>Else NOP<br>Store PE #(PET) RING #(RIT) C/S in MEM |
| xxxxxx5 | 10 | EA = Type-3 | Ring-0/SP-MEM-0(EA) ← R(TRGT@Ring-0/PET)<br>Ring-1/SP-MEM-1(EA) ← R(TRGT@Ring-1/PET)<br>Ring-2/SP-MEM-2(EA) ← R(TRGT@Ring-2/PET)<br>Ring-3/SP-MEM-3(EA) ← R(TRGT@Ring-3/PET) |

What is claimed is:

1. A data processing system, comprising:

a first memory for storing a first group of instructions and a first group of data;

a first control unit, including a multiplexer means, coupled to the first memory, for fetching first instructions and first data from the first memory;

said first instructions each including a tag portion which determines how the instruction is to be executed at a processor, a topology configuration value, and an opcode portion;

said first data including a first unit of data and a second unit of data;

a plurality of first processor elements coupled to the first control unit by means of a first data bus and a first instruction bus, each of the processor elements having a unique identity value enabling a unique one of more than two interpretations of said instructions depending on the identity value of a processor element;

each of the first processor elements including an instruction decode coupled to the first instruction bus, for processing said unique identity value thereof with said tag portion of a particular one of the first instructions received on the instruction bus to determine how the instruction is to be executed at the processor;

each of the first processor elements further including a general purpose register file coupled to the first data bus and coupled to the instruction decode therein, for selectively buffering either said first unit of data or said second unit of data received on the first data bus in response to said instruction decode thereof determining how said particular instruction is to be executed at the processor;

each of the first processor elements further including an arithmetic element coupled to the first data bus and coupled to the instruction decode therein, for performing custom execution of said particular one of the first instructions in response to said instruction decode thereof determining how said particular instruction is to be executed at the processor;

said multiplexer means receiving said topology configuration value in said first instructions, for selectively broadcasting said first instructions to selected combinations of said first processor elements in response to said topology configuration value;

each of the first processor elements further including a mode register coupled to said first instruction bus, for receiving said topology configuration value in said first instructions;

each of the first processor elements further including an interconnection switch coupled to an interprocessor link and to said mode register thereof, for selectively interconnecting a first one of said processor elements to another one of said processor elements in response to said topology configuration value in said first instructions;

said plurality of first processors being arranged into a first folded mesh or alternately into a second folded mesh, in response to said topology configuration value in said first instructions, and means in each respective processing element for executing the instruction to send result data in a customized direction to another one of said processor elements in the array, in response to said instruction decode thereof determining how said particular instruction is to be executed at the processor.

2. The system of claim 1, which further comprises:

a second memory coupled to said system interface control, for storing a second group of data;

a second control unit coupled to said first memory over a control unit bus and coupled to the second memory, for receiving said first instructions from said first control unit and receiving said second data from the second memory;

a plurality of second processor elements coupled to the second control unit by means of a second data bus and a second instruction bus, each of the processor elements having a unique identity value;

each of the second processor elements including an instruction decode coupled to the second instruction bus, for processing said unique identity value thereof with said tag portion of said particular one of said first instructions received on the instruction bus to determine how the instruction is to be executed at the processor;

each of the second processor elements further including a general purpose register file coupled to the second data bus and coupled to the instruction decode therein, for selectively buffering data received on the second data bus in response to said instruction decode thereof determining how said particular instruction is to be executed at the processor;

each of the second processor elements further including an arithmetic element coupled to the second data bus and coupled to the instruction decode therein, for executing said particular one of the first instructions in response to said instruction decode thereof determining how said particular instruction is to be executed at the processor;

whereby a single instruction broadcast from the first control unit, can control diverse data buffering and arithmetic operations in said plurality of second processor elements.

3. The system of claim 2, which further comprises:

said plurality of first processors and said plurality of second processors being arranged into a first folded mesh.

4. The system of claim 2, which further comprises:

each of the first processor elements and the second processor elements further including an interconnection switch coupled to an interprocessor link, for selectively transferring data to another one of said processor elements in response to said instruction decode thereof decoding said particular instruction.

5. The system of claim 4, which further comprises:

said plurality of first processors and said plurality of second processors being arranged into a first folded mesh.

6. The system of claim 2, which further comprises:

each of the first processor elements and the second processor elements further including a mode register coupled to said first instruction/data local memory, for receiving a topology configuration value in said first instructions;

each of the first processor elements and the second processor elements further including an interconnection switch coupled to an interprocessor link and to said mode register thereof, for selectively interconnecting a first one of said processor elements to another one of said processor elements in response to said topology configuration value in said first instructions.

7. The system of claim 6, which further comprises:

said plurality of first processors and said plurality of second processors being arranged into a first folded mesh or alternately into a second folded mesh, in response to said topology configuration value in said first instructions.

8. The system of claim 1, which further comprises:

a second memory coupled to the system interface control, for storing a second group of instructions and a second group of data;

a second control unit coupled to the second memory, for fetching second instructions and second data from the second memory;

said second instructions each including a tag portion and an opcode portion;

said second data including a first unit of data and a second unit of data;

a plurality of second processor elements coupled to the second control unit by means of a second data bus and a second instruction bus, each of the processor elements having a unique identity value;

each of the second processor elements including an instruction decode coupled to the second instruction bus, for processing said unique identity value thereof with said tag portion of a particular one of the second instructions received on the instruction bus to determine how the instruction is to be executed at the processor;

each of the second processor elements further including a general purpose register file coupled to the second data bus and coupled to the instruction decode therein, for selectively buffering either said first unit of data or said second unit of data received on the second data bus in response to said instruction decode thereof determining how said particular instruction is to be executed at the processor;

each of the second processor elements further including an arithmetic element coupled to the second data bus and coupled to the instruction decode therein, for executing said particular one of the second instructions in response to said instruction decode thereof determining how said particular instruction is to be executed at the processor;

whereby a single instruction broadcast from the second control unit, can control diverse data buffering and arithmetic operations in said plurality of processor elements.

9. The system of claim 8, which further comprises:

said plurality of first processors and said plurality of second processors being arranged into a first folded mesh.

10. The system of claim 8, which further comprises:

each of the first processor elements and the second processor elements further including an interconnection switch coupled to an interprocessor link, for selectively transferring data to another one of said processor elements in response to said instruction decode thereof decoding said particular instruction.

11. The system of claim 10, which further comprises:

said plurality of first processors and said plurality of second processors being arranged into a first folded mesh.

12. The system of claim 8, which further comprises:

each of the first processor elements and the second processor elements further including a mode register coupled to said first instruction/data local memory, for receiving a topology configuration value in said instructions;

each of the first processor elements and the second processor elements further including an interconnection switch coupled to an interprocessor link and to said mode register thereof, for selectively interconnecting a first one of said processor elements to another one of said processor elements in response to said topology configuration value in said instructions.

13. The system of claim 12, which further comprises:

said plurality of first processors and said plurality of second processors being arranged into a first folded mesh or alternately into a second folded mesh, in response to said topology configuration value in said instructions.

14. A data processing method, comprising:

storing in a first memory, a first group of instructions and a first group of data;

fetching first instructions and first data from the first memory using a first control unit coupled to the first memory;

said first instructions each including a tag portion which determines how the instruction is to be executed at a processor, a topology configuration value, and an opcode portion;

said first data including a first unit of data and a second unit of data;

selectively broadcasting said first instructions to selected combinations of a plurality of first processor elements in response to said topology configuration value;

arranging the plurality of first processors into a first folded mesh or alternately into a second folded mesh, in response to said topology configuration value in said first instructions;

processing a unique identity value in each of the plurality of first processor elements with said tag portion of a particular one of the first instructions to determine how the instruction is to be executed at each processor, said identity value enabling a unique one of more than two interpretations of said instructions depending on the identity value of a processor element;

selectively buffering either said first unit of data or said second unit of data in response to said instruction decode thereof determining how said particular instruction is to be executed at each processor;

performing customized execution of said particular one of the first instructions in response to said determining how said particular instruction is to be executed at each processor;

sending result data from said each processor, resulting from said customized execution in a customized direction to another one of said processor elements in the array, in response to said determining how said particular instruction is to be executed at each processor;

whereby a single instruction broadcast to said plurality of processor elements can control diverse data buffering and arithmetic operations therein.

15. The method of claim 14, which further comprises:

said plurality of first processors and a plurality of second processors being arranged into a first folded mesh.

16. The method of claim 14, which further comprises:

selectively transferring data to another one of said processor elements in response to decoding said particular instruction.

17. The method of claim 16, which further comprises:

said plurality of first processors and a plurality of second processors being arranged into a first folded mesh.

18. The method of claim 14, which further comprises:

receiving a topology configuration value in said instructions;

selectively interconnecting a first one of said processor elements to another one of said processor elements in response to said topology configuration value in said instructions.

19. An array processor architecture comprising:

a memory for storing instructions having a tag portion which determines how the instruction is to be executed at a processor and a topology configuration value;

a plurality of control units coupled to said memory, for outputting plural instruction threads containing said instructions to selected ones of a plurality of processor elements in response to said topology configuration value;

said plurality of processor elements each having a unique ID, coupled to said control units, for executing said instructions in said threads and generating unique configuration control signals which are derived from said unique ID, said topology configuration value, and said tag;

each of said plurality of processor elements performing custom execution of said instructions in response to said unique ID;

a configuration control means in each of said processor elements, for selectively interconnecting said plural processor elements in response to said control signals, and directing means in each of said processor elements for sending result data in a customized direction to another one of said processor elements in the array, in response to said control signals.

20. A data processing method, comprising:

fetching from a memory a first instruction which includes a tag portion which determines how the instruction is to be executed at a processor, a topology configuration value, and an opcode portion;

selectively distributing said instruction in response to said topology configuration value, to a plurality of processor elements each of which has a unique identity enabling a unique one of more than two interpretations of said instruction depending on the identity value of a processor element;

decoding said instruction in each of said plurality of processor elements, using a customized decoding derived from said unique identity of each processor element;

performing customized execution of said instruction in said each of said plurality of processor elements, to perform a unique operation in response to said customized decoding in the processor element, and sending result data in a customized direction from said each of said plurality of processor elements, resulting from said customized execution, to another one of said processor elements in the array, in response to said customized decoding in the processor element.

21. The method of claim 20, which further comprises:

said processor elements including a first plurality of arithmetic processor elements and a second plurality of sequencing processor elements.

22. The method of claim 20, which further comprises:

said fetching step and said distributing step being performed in a single machine cycle.

23. The method of claim 20, which further comprises:

said fetching step and said distributing step being performed in separate, consecutive machine cycles.

* * * * *